(12) United States Patent
Mittal et al.

(10) Patent No.: US 11,580,755 B2
(45) Date of Patent: Feb. 14, 2023

(54) METHOD, APPARATUS, AND SYSTEM FOR DETERMINING POLYLINE HOMOGENEITY

(71) Applicant: HERE Global B.V., Eindhoven (NL)

(72) Inventors: Anish Mittal, Berkeley, CA (US); Richard Kwant, Oakland, CA (US); Zhanwei Chen, Oakland, CA (US); Himaanshu Gupta, San Francisco, CA (US); David Lawlor, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 164 days.

(21) Appl. No.: 16/995,495

(22) Filed: Aug. 17, 2020

(65) Prior Publication Data

US 2020/0380271 A1 Dec. 3, 2020

Related U.S. Application Data

(63) Continuation of application No. 15/946,364, filed on Apr. 5, 2018, now Pat. No. 10,789,487.

(51) Int. Cl.
*G06V 20/56* (2022.01)
*G05D 1/00* (2006.01)
(Continued)

(52) U.S. Cl.
CPC ....... *G06V 20/588* (2022.01); *G01C 21/3867* (2020.08); *G01C 21/3881* (2020.08);
(Continued)

(58) Field of Classification Search
CPC .... G06V 20/588; G06V 20/56; G06V 10/761; G06V 30/19093; G06V 10/774;
(Continued)

(56) References Cited

U.S. PATENT DOCUMENTS 6,195,445 B1 * 2/2001 Dubuisson-Jolly ........................ G06V 10/245
382/128
8,031,948 B2 10/2011 Liu et al.
(Continued)

FOREIGN PATENT DOCUMENTS

EP 3149704 A1 4/2017
EP 3149704 B1 8/2018
(Continued)

OTHER PUBLICATIONS

Office Action for related European Patent Application No. 19166907.6-1207, dated Jul. 20, 2021, 5 pages.
(Continued)

*Primary Examiner* — Molly Wilburn
(74) *Attorney, Agent, or Firm* — Ditthavong, Steiner & Mlotkowski

(57) ABSTRACT

An approach is provided for an asymmetric evaluation of polygon similarity. The approach, for instance, involves receiving a first polygon representing an object depicted in an image. The approach also involves generating a transformation of the image comprising image elements whose values are based on a respective distance that each image element is from a nearest image element located on a first boundary of the first polygon. The approach further involves determining a subset of the plurality of image elements of the transformation that intersect with a second boundary of a second polygon. The approach further involves calculating a polygon similarity of the second polygon with respect the first polygon based on the values of the subset of image elements normalized to a length of the second boundary of the second polygon.

17 Claims, 20 Drawing Sheets

(51) Int. Cl.
  *G06K 9/62* (2022.01)
  *G06T 11/20* (2006.01)
  *G06T 7/12* (2017.01)
  *G05D 1/02* (2020.01)
  *G01C 21/00* (2006.01)

(52) U.S. Cl.
  CPC ......... *G05D 1/0088* (2013.01); *G05D 1/0246* (2013.01); *G06K 9/6215* (2013.01); *G06K 9/6256* (2013.01); *G06T 7/12* (2017.01); *G06T 11/203* (2013.01); *G06V 20/56* (2022.01); *G06T 2207/20081* (2013.01); *G06T 2207/20084* (2013.01); *G06T 2207/30256* (2013.01)

(58) Field of Classification Search
  CPC .. G06V 30/19147; G06K 9/00; G06K 9/6215; G06K 9/6256; G05D 1/0088; G05D 1/0246; G06T 7/12; G06T 11/203; G06T 2207/20081; G06T 2207/20084; G06T 2207/30256; G01C 21/32
  See application file for complete search history.

(56) References Cited

U.S. PATENT DOCUMENTS

| | | | |
|---|---|---|---|
| 9,626,593 B2 | 4/2017 | Ahmed et al. | |
| 10,789,487 B2* | 9/2020 | Mittal | G01C 21/32 |
| 11,068,724 B2* | 7/2021 | Liu | G06N 3/08 |
| 11,210,537 B2* | 12/2021 | Koivisto | G06N 3/0445 |
| 2007/0083557 A1* | 4/2007 | Leiserowitz | G01C 21/3682 |
| 2007/0286493 A1* | 12/2007 | Liu | G06V 10/469 |
| | | | 382/218 |
| 2008/0123994 A1* | 5/2008 | Schultz | G06T 3/0031 |
| | | | 382/284 |
| 2008/0253688 A1 | 10/2008 | Safra et al. | |
| 2013/0077856 A1* | 3/2013 | Ferro | G06K 9/6255 |
| | | | 382/159 |
| 2015/0063707 A1* | 3/2015 | Fu | G06T 7/13 |
| | | | 382/199 |
| 2019/0012563 A1* | 1/2019 | Gusarov | G06T 7/181 |
| 2019/0130537 A1* | 5/2019 | Agrawal | G06T 3/40 |
| 2019/0266418 A1* | 8/2019 | Xu | G06V 10/457 |
| 2020/0249684 A1* | 8/2020 | Onofrio | G05D 1/0219 |

FOREIGN PATENT DOCUMENTS

| | | |
|---|---|---|
| EP | 3550471 A1 | 10/2019 |
| WO | 201518156 A1 | 12/2015 |

OTHER PUBLICATIONS

Stack Exchange, "How to Compare 2 Polyline Datasets?", web page, retrieved on Feb. 7, 2018 from https://gis.stackexchange.com/q~~uestions/8799/how-to-compare-2-polyline-datasets, 1 page.

Gjaldbaek, "Practical Polyline Matching for GPS Data", retrieved on Feb. 7, 2018 from http://etd.dtu.dk/thesis/268267/ep10_81.pdf, pp. 1-24.

Stack Overflow, "Determining Approximate Overlaps of a Given Polyline with a Set of Existing Polylines", web page, retrieved on Feb. 7, 2018 from https://stackoverflow.com/questions/21801366/determining-approximate-overlaps-of-a-given-polyline-with-a-set-of-existing-poly, 1 page.

Wenyin et al., "A protocol for performance evaluation of line detection algorithms", published in Machine Vision and Applications, Feb. 27, 1997, pp. 240-250.

Russ et al., "Two-Dimensional Measurements (Part 1)" Chapter 3, Jun. 5, 2012, pp. 105-108.

Churchill et al., "Practice makes perfect? Managing and leveraging visual experiences for lifelong navigation", Published in: International conference on robotics and automation, May 14, 2012, 8 pages.

Office Action for corresponding European Patent Application No. 19166907.6-1207, dated Sep. 11, 2019, 10 pages.

* cited by examiner

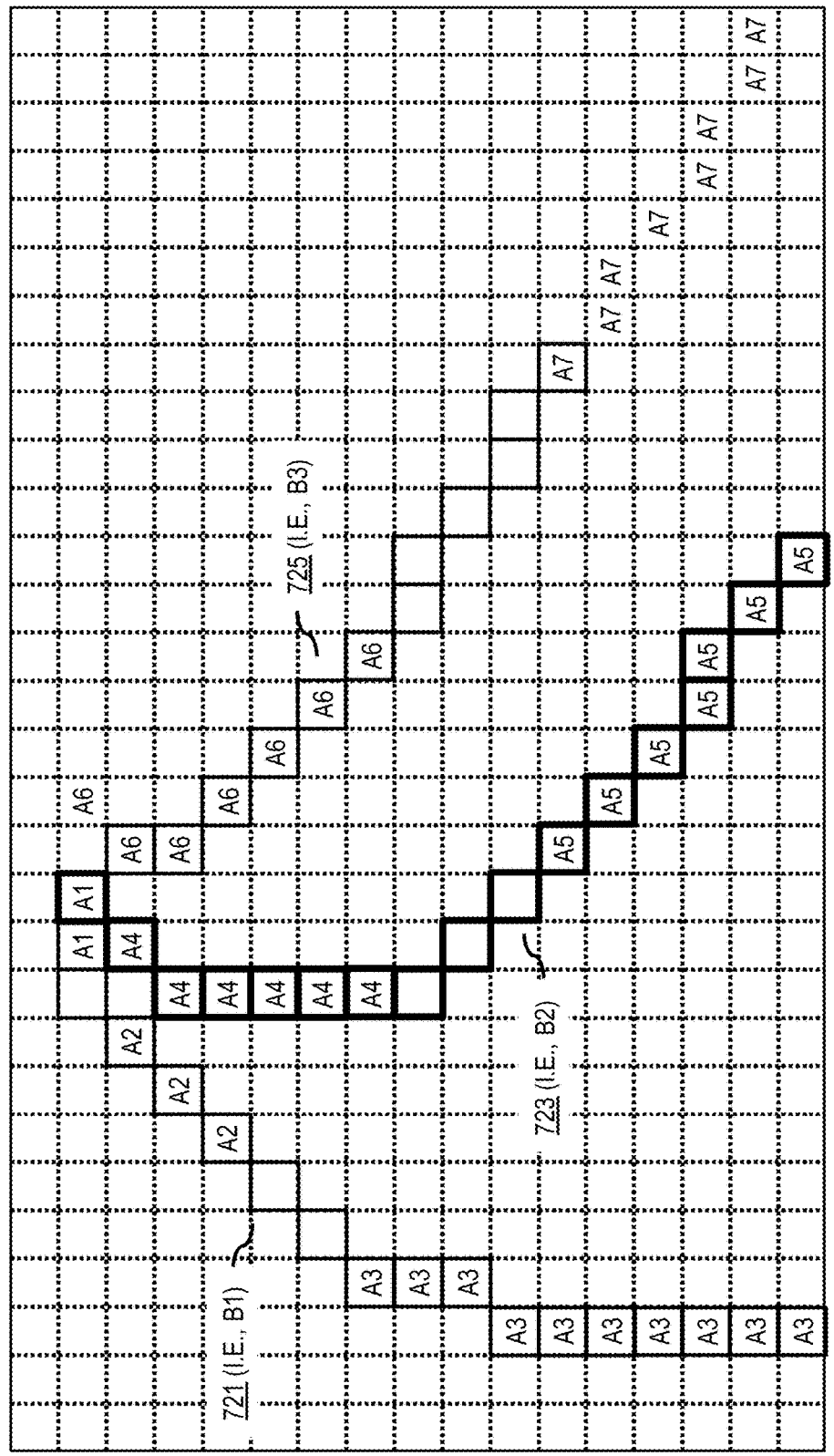

METHOD, APPARATUS, AND SYSTEM FOR DETERMINING POLYLINE HOMOGENEITY

RELATED APPLICATION

This application is a continuation of U.S. application Ser. No. 15/946,364, filed Aug. 17, 2018, entitled "Method, Apparatus, and System for Determining Polyline Homogeneity," the contents of which are hereby incorporated herein in their entirety by this reference.

BACKGROUND

Object detection has recently seen a surge of intense research interest, driven by applications in diverse fields such as autonomous driving, video surveillance, the internet of things (IoT), etc. While the particulars of individual use-cases may differ significantly, the basic premise of object detection remains constant: given a raster image (or sequence of images), identify the pixels corresponding to a particular object of interest, and construct polylines (or polygons) to represent the object of interest from the identified pixels. However, significant technical challenges remain with respect to comparing the extracted polylines or polygons with previous detections or other reference polylines or polygons to evaluate their overall quality (e.g., in terms of homogeneity or similarity between multiple polylines or polygons).

SOME EXAMPLE EMBODIMENTS

Therefore, there is a need for an approach for determining polyline homogeneity between multiple sets of polylines (e.g., as determined by a computer vision system).

According to one embodiment, a computer-implemented method comprises rendering a first set of polylines onto a first image grid and a second set of polylines onto a second image grid. The first image grid and the second image grid, for instance, share a grid pattern. The method also comprises labeling one or more first cells of the first image grid to indicate at least one first polyline of the first set based on determining that the at least one first polyline occupies the one or more first cells. The method further comprises labeling one or more second cells of the second image grid to indicate at least one second polyline of the second set based on determining that the at least one second polyline occupies the one or more second cells. The method further comprises, for each of the at least one first polyline in the first set, determining one or more matching cells from among the one or more second cells that matches the one or more first cells labeled to indicate said each of the least one first polyline. The method further comprises determining a percent composition indicating a respective percentage of each of the at least one second polyline occupying the one or more matching cells for said each of the at least one first polyline based on the labeling of the one or more second cells. By way of example, the percent composition is a representation of the polyline homogeneity of the first set with respect to the second set.

According to another embodiment, an apparatus comprises at least one processor, and at least one memory including computer program code for one or more computer programs, the at least one memory and the computer program code configured to, with the at least one processor, cause, at least in part, the apparatus to render a first set of polylines onto a first image grid and a second set of polylines onto a second image grid. The first image grid and the second image grid, for instance, share a grid pattern. The apparatus is also caused to label one or more first cells of the first image grid to indicate at least one first polyline of the first set based on determining that the at least one first polyline occupies the one or more first cells. The apparatus is further caused to label one or more second cells of the second image grid to indicate at least one second polyline of the second set based on determining that the at least one second polyline occupies the one or more second cells. The apparatus is further caused to, for each of the at least one first polyline in the first set, determine one or more matching cells from among the one or more second cells that matches the one or more first cells labeled to indicate said each of the least one first polyline. The apparatus is further caused to determine a percent composition indicating a respective percentage of each of the at least one second polyline occupying the one or more matching cells for said each of the at least one first polyline based on the labeling of the one or more second cells. By way of example, the percent composition is a representation of the polyline homogeneity of the first set with respect to the second set.

According to another embodiment, a non-transitory computer-readable storage medium carries one or more sequences of one or more instructions which, when executed by one or more processors, cause, at least in part, an apparatus to render a first set of polylines onto a first image grid and a second set of polylines onto a second image grid. The first image grid and the second image grid, for instance, share a grid pattern. The apparatus is also caused to label one or more first cells of the first image grid to indicate at least one first polyline of the first set based on determining that the at least one first polyline occupies the one or more first cells. The apparatus is further caused to label one or more second cells of the second image grid to indicate at least one second polyline of the second set based on determining that the at least one second polyline occupies the one or more second cells. The apparatus is further caused to, for each of the at least one first polyline in the first set, determine one or more matching cells from among the one or more second cells that matches the one or more first cells labeled to indicate said each of the least one first polyline. The apparatus is further caused to determine a percent composition indicating a respective percentage of each of the at least one second polyline occupying the one or more matching cells for said each of the at least one first polyline based on the labeling of the one or more second cells. By way of example, the percent composition is a representation of the polyline homogeneity of the first set with respect to the second set.

According to another embodiment, an apparatus comprises means for rendering a first set of polylines onto a first image grid and a second set of polylines onto a second image grid. The first image grid and the second image grid, for instance, share a grid pattern. The apparatus also comprises means for labeling one or more first cells of the first image grid to indicate at least one first polyline of the first set based on determining that the at least one first polyline occupies the one or more first cells. The apparatus further comprises means for labeling one or more second cells of the second image grid to indicate at least one second polyline of the second set based on determining that the at least one second polyline occupies the one or more second cells. The apparatus further comprises means for, for each of the at least one first polyline in the first set, determining one or more matching cells from among the one or more second cells that matches the one or more first cells labeled to indicate said each of the least one first polyline. The apparatus further comprises means for determining a percent composition indicating a respective percentage of each of the at least one second polyline occupying the one or more matching cells for said each of the at least one first polyline based on the labeling of the one or more second cells. By way of example, the percent composition is a representation of the polyline homogeneity of the first set with respect to the second set.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A and 7B are diagrams respectively illustrating determining a polyline homogeneity of a first set with respect to a second set of polylines, and vice versa, according to one embodiment;

DESCRIPTION OF SOME EMBODIMENTS

Examples of a method, apparatus, and computer program for determining polyline homogeneity are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
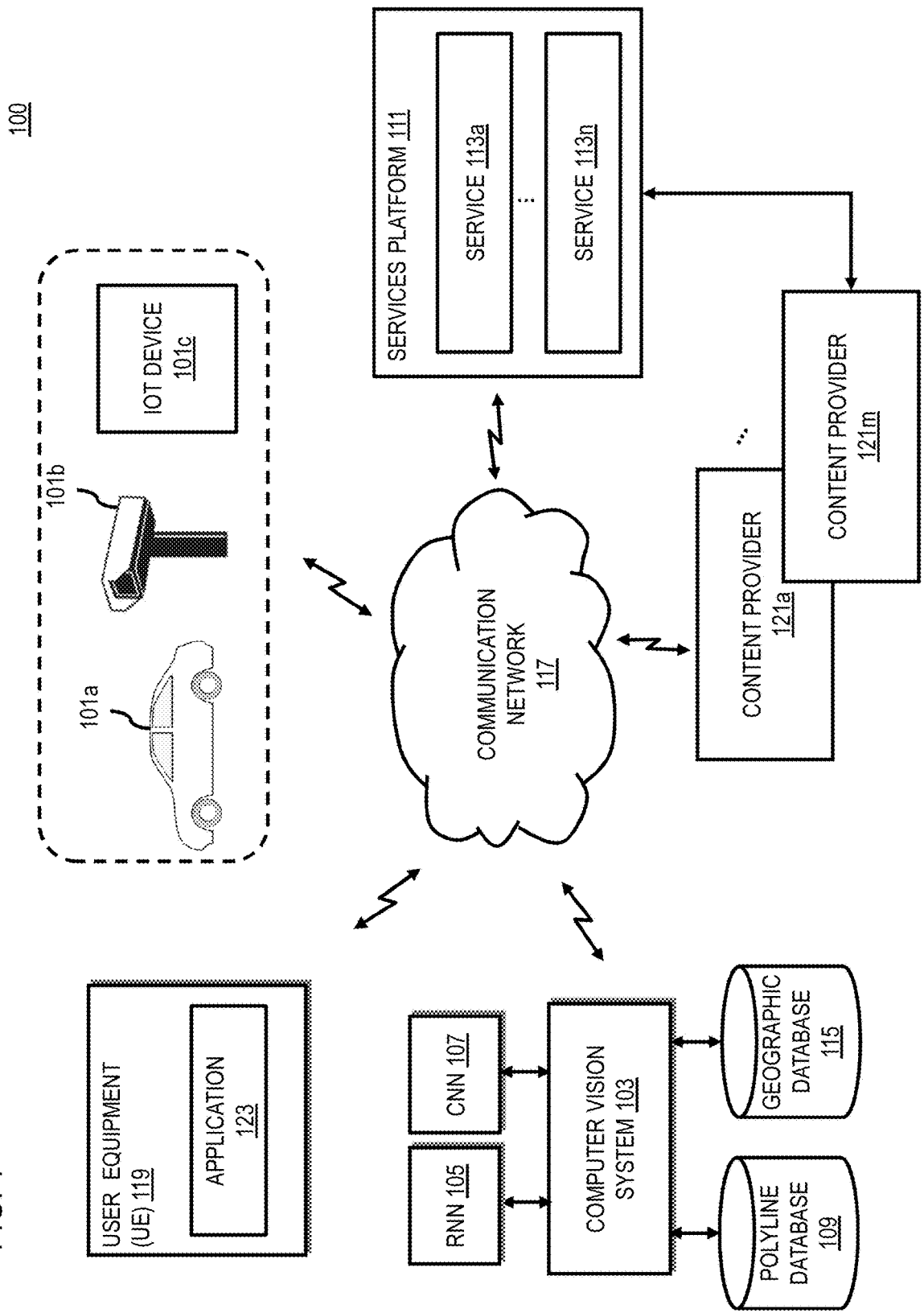
FIG. 1 is a diagram of a system capable of determining polyline homogeneity, according to one embodiment.

FIG. 1 is a diagram of a system capable of providing an asymmetric evaluation of polygon similarity, according to one embodiment. As discussed above, object detection from image data (e.g., rasterized images or a sequence of images, such as a video, made from pixels) is spurring intense interest in the development of new and compelling use cases and/or services such as, but not limited to, autonomous driving, mapping, video surveillance, the internet of things (IoT), and/or the like. For example, in the case of autonomous driving, objects of interest might include lane lines, roadside signs, guardrails, horizon estimates, or other vehicles captured by the camera sensors of an autonomous vehicle 101*a*. In the case of video surveillance, the objects might be faces, people, or vehicles captured by a surveillance camera 101*b*; and in IoT, they might include shipping containers, items cooking in an oven, and/or any other object of interest to an IoT device 101*c*; and for autonomous driving, they might include roadside signs, guardrails, or other vehicles captured by an autonomous vehicle 101*a*.

In particular, autonomous driving is quickly becoming a reality following advances in machine learning, computer vision, and compute power. The ability to perceive the world with an accurate semantic understanding enables vehicles 101*a* to obey driving rules and avoid collisions. As these perceptual abilities, have improved, so too has the need for highly accurate and up-to-date maps. Path planning requires knowledge of what to expect beyond a vehicle's perceptual horizon, and driving in complicated urban environments with many occluding objects requires a knowledge of what cannot be seen.

As a result, mapping service providers are creating accurate and up-to-date high-resolution map for automated driving. One requirement for creating this map is perception (e.g., through object detection using a computer vision system 103 and/or other sensor data). For example, map creation and update generally involve automating the conversion of sensor data—imagery, LIDAR, etc.—into map geometry and attributes. By way of example, mapping service providers can use perspective imagery for at least two use cases. First, feature detection through object recognition can enable localization with respect to an existing map. Second, feature detection can also enable map change detection and subsequent map update. Ideally, feature detection in both cases, should occur faster than real time to enable localization and change detection in real-time applications such as autonomous driving.

One traditional approach to feature or object detection from image data involves the use of low-level features such as those detected using scale-invariant feature transform (SIFT) or oriented fast and rotated brief (ORB). While these features do not require a learning framework and occur frequently, they often fail to persist and assume different values in various environmental and lighting conditions. This instability can degrade feature detection performance in the autonomous driving or other similar real-time application because localization and mapping require that features are matched against a database of previous detections. In contrast to these low-level features, high-level semantic features are stable in different conditions and therefore reproducible across time. Many high-level semantic features, including lane markings, signs, poles, and barriers, occur frequently on and around roads, and these features also have regular geometries and attributes that are amenable to localization and mapping. Moreover, these features change infrequently in the real world and can be referenced over time.

Autonomous driving generally requires high accuracy, real-time localization of vehicles. Up to this point, most vehicle navigation and localization have been accomplished using GPS or equivalent location sensors, which typically provides a real-time location with a 95% confidence interval of 7.8 meters, per the US Government. However, in complicated urban environments, reflection of GPS signals can further increase this error, such that a GPS-based location may be off by as much as 30 meters. Given that the width of many lanes is 3-4 meters, this accuracy is not sufficient to properly localize an autonomous vehicle so that it can make safe route planning decisions. Other sensors, such as inertial measurement units (IMUs) can increase the accuracy of localization by considering vehicle movement, but these sensors tend to drift and still do not provide sufficient accuracy for localization. In general, the industry recognizes that a localization accuracy of around 10 cm is needed for safe driving in many areas. One way to achieve this level of accuracy is to use visual odometry, in which high level road side features are detected from imagery. These features can then be matched to their georeferenced versions stored in a database to determine a location. This matching generally is based comparing the features or objects detected in images captured by the vehicles 101*a*.

In one embodiment, feature or objection detection refers to a process performed by a computer vision system 103 of capturing or otherwise obtaining an image (e.g., rasterized images or a sequence of images, such as a video, made from pixels) depicting a feature or object of interest. The computer vision system 103 then uses any process known in the art to identify the pixels corresponding to the particular feature or object of interest (e.g., machine learning processes using a recurrent neural network (RNN) 105, convolutional neural network (CNN) 107, or equivalent). The computer vision system 100 can use polylines, polygonal boundaries, bounding boxes, etc. to represent the shape of the identified pixels corresponding to the feature or object of interest. Therefore, regardless of the use case (e.g., autonomous driving, video surveillance, IoT, etc.), a primary input for initiating respective services or functions of the use cases are the polylines or polygons generated by the computer vision system 103.

As indicated above, matching the detected polylines or polygons against previous detections or other reference polylines or polygons (e.g., reference polylines or polygons that are mapped to known locations). Accordingly, determining the homogeneity of two or more sets of polylines or polygons is a significant technical challenge when using the computer vision system 103 for any of the use-cases mentioned above. For example, a method for evaluating homogeneity generally must meet the technical requirements of a desired behavior or function of the object detection system under a desired use case, and then choose an evaluation metric which encourages the desired behavior to ensure that object detection performance meets the performance requirements of each use case. For example, in various embodiments, polyline or polygon homogeneity can be used to confirm a detected object and/or its identification, identify object movements, match detected objects to a library of objects (e.g., reference polygon objects stored in the polygon database 109), and/or any other function supported by an object detection use case, including those not specifically discussed herein.

To address these technical challenges, the system 100 introduces a computer vision system 103 that uses a homogeneity metric that is not only sensitive to polyline/polygon similarity, but also to the purity of composition of one set of polylines/polygons with respect to another set. For matching or fault analysis (e.g., faults in feature or object detection), the embodiments of the polyline/polygon homogeneity metric describe herein provides an understanding of the relationship between two or more sets of polylines/polygons. More specifically, the system 100 provides an approach for representing a set of polylines using another set, so that the homogeneity/purity of each set can be represented in terms of the polylines/polygons for the other set. For example, if a polyline of a first set can be represented entirely by one polyline of a second set, then the polyline can be determined to have a high homogeneity or purity with respect to the second set. Conversely, if the polyline can only be represented from multiple polylines of the second set or have gaps where a portion or entirety of the polyline of the first set cannot be represented by any of the polylines of the second set, then the polyline can be determined to have a low homogeneity or purity with respect to the second set.

In other words, the embodiments described herein represent each polyline/polygon in one set using the polylines/polygons in the other set and vice versa. In one embodiment, the homogeneity or purity is calculated as the percent composition of every polyline/polygon in one set based on the polylines/polygons in the other set. For the pieces of the polyline/polygon with no counterpart polyline/polygon pieces in the other set, they are considered matched to the background polyline/polygon class of the other set. In this way, the background class can be included as part of the calculated percent composition for each set.

In addition, the embodiments of polyline/polygon homogeneity determined according to the various embodiments described herein are asymmetric, meaning that the homogeneity of a first set of polylines/polygon with respect to a second is not generally equal to the polygon similarity of the second set to the first set. The asymmetry of the embodiments of polyline/polygon homogeneity described herein results in a technical improvement of the computer vision system 103 by enabling a finer measure of granularity in the polyline/polygon homogeneity evaluation process. In use cases where asymmetry is not needed or used, the computer vision system 103 can report either of the asymmetric values as individual values, or combine the asymmetric value into a single value, for instance, by averaging the asymmetric values or performing another equivalent operation.

Embodiments of the processes for determining polyline/polygon homogeneity are described in further detail with respect to FIGS. 2-8B below. For simplicity and clarity, the embodiments are described with respect to polyline homogeneity. However, it is contemplated that embodiments apply equally to determining the homogeneity or purity of polygons. Accordingly, wherever the term polyline is used, the term polyline and/or polygon can be substituted when describing the embodiments of determining homogeneity.

Figure 2:
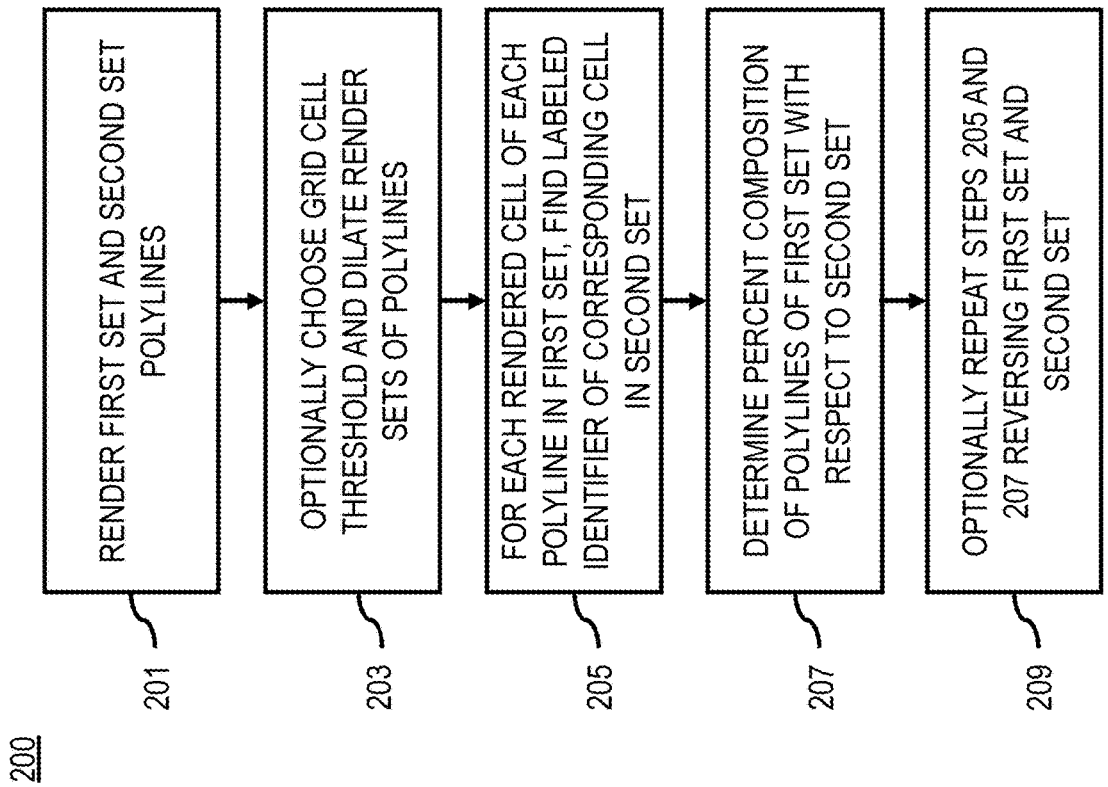
FIG. 2 is a flowchart of a process for determining polyline homogeneity, according to one embodiment.
Figure 11:
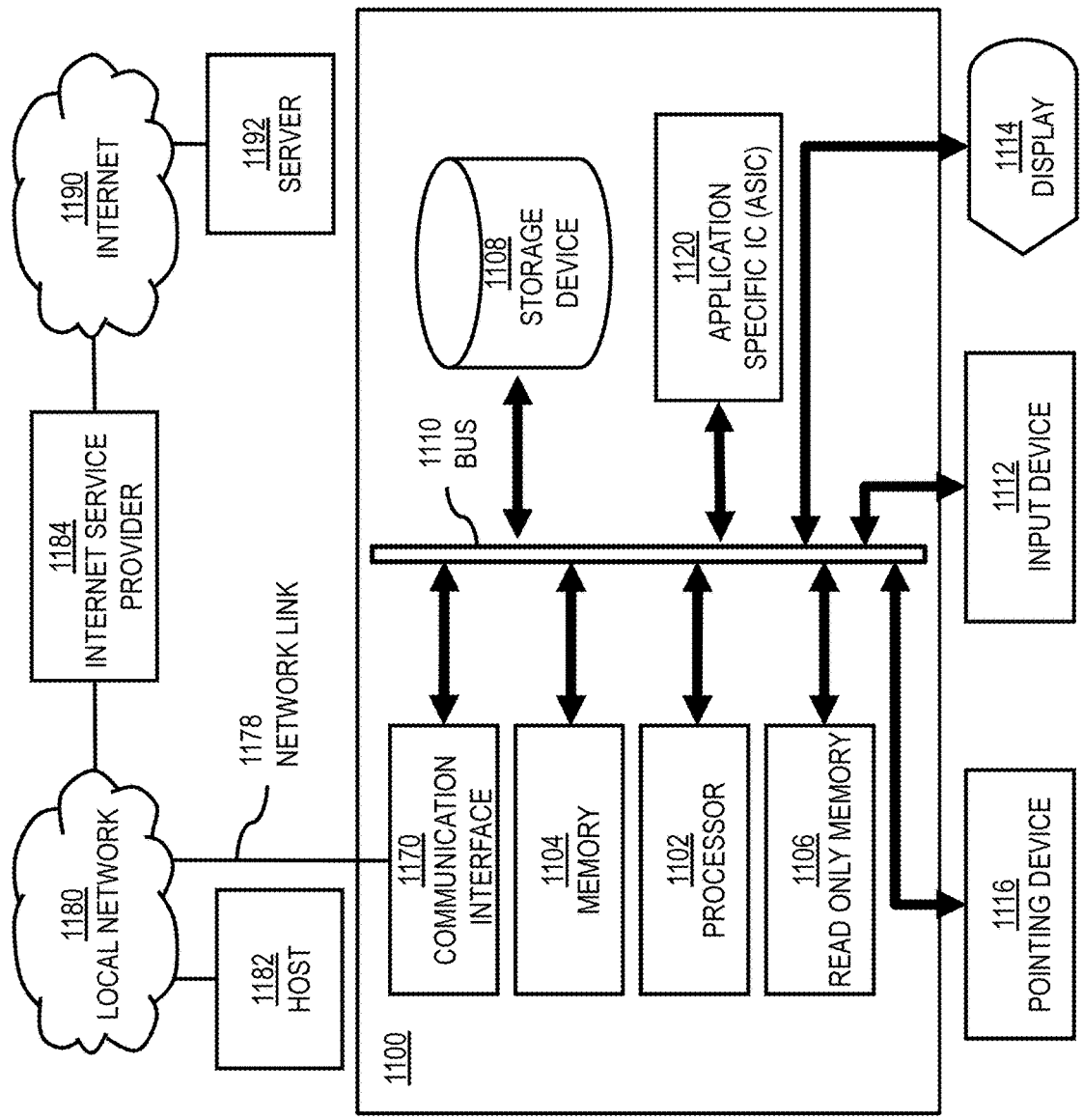
FIG. 11 is a diagram of hardware that can be used to implement an embodiment of the processes described herein.

FIG. 2 is a flowchart of a process for determining polyline homogeneity, according to one embodiment. In one embodiment, the computer vision system 103 may perform one or more portions of the process 200 and may be implemented in, for instance, a chip set including a processor and a memory as shown in FIG. 11. As such, the computer vision system 103 can provide means for accomplishing various parts of the process 200. In addition or alternatively, a services platform 111 (e.g., operated a mapping service provider) and/or one or more services 113a-113n (also collectively referred to as services 113) may perform any combination of the steps of the process 200 in combination with the computer vision system 103 or as standalone components. Although the process 200 is illustrated and described as a sequence of steps, it is contemplated that various embodiments of the process 200 may be performed in any order or combination and need not include all of the illustrated steps. The process 200 is discussed with respect to the examples of FIGS. 3-8B below.

For illustration, the embodiments of the process 200 are described with respect to detecting features or objects (e.g., lane line markings, road contours, etc.) depicted in an image or sequence of images as polylines. However, it is contemplated that the embodiments described herein can be generalized to polygons or any N-dimensional setting in which objects and/or corresponding polylines/polygons of any N-dimensions can be detected (e.g., two-dimensional planes, three-dimensional polygons, etc.). For example, with respect to polyline representations of features or objects, the edges of the representations are one-dimensional lines. With respect to three-dimensional representations, the edges of the objects are two-dimensional planes cutting through three-dimensional space. Application of the various embodiments described herein to higher dimensions can then be generalized to N-dimensional representations whose edges are $(N-1)$-dimensional hyperplanes that cut through a N-dimensional space.

In one embodiment, as a precursor to the process 200, the computer vision system 103 can generate or otherwise retrieve sets of polylines. For example, the computer vision system 103 can receive image data depicting features or objects to be recognized and process. In one embodiment, the input image can be a raster image of size m by n image elements (that is, m rows and n columns of image elements). In this example, an image element refers to an element or cell of an image grid created by the m rows and n columns of the raster image. In one embodiment, each image element or cell of the image grid corresponds to an individual pixel of the raster image, so that the number of rows and columns correspond to the pixel resolution of the image. Alternatively, each image element can refer to a group of pixels (e.g., 4 pixels of a 2×2 pixel group, 9 pixels of a 3×3 pixel group, 16 pixels of a 4×4 pixel group, etc.). Accordingly, it is contemplated that references to an image element can be used interchangeably with a pixel or grid cell, and vice versa in the description of the embodiments described herein. In this way, in one embodiment, the computer vision system 103 can effectively down sample a higher resolution input image to reduce computer resource usage when a higher resolution of the input image is not needed or desired for a given use case. Although the image elements are described with respect to a two-dimensional image, it is contemplated that the image element can a three-dimensional image element (e.g., a cube version of a pixel), or a higher N dimension depending on the dimensional space of the polygons being compared.

To prepare the input image or images for input into the process 200, the computer vision system 100 can use any object detection approach known in the art (e.g., machine learning-based object detection using a CNN 107 and/or RNN 105) to generate polyline representations of detected objects. For example, convolutional neural networks such as the CNN 107 have shown unprecedented ability to recognize objects in images, understand the semantic meaning of images, and segment images according to these semantic categories. In one embodiment, the CNN 107 can be used in combination with the RNN 105 to trace the contours an objected detected in the input image to generate a polygon representation. For example, the computer vision system 103 can use the RNN 105 or other equivalent machine learning or neural network to traverse a feature map (e.g., a convolutional feature map encoding object features detected from an input image by the CNN 107) like a cursor (e.g., a cursor recurrent neural network). During the traversal, the RNN 105 uses information from its current location in the feature map to determine a location where the RNN 105 should go next to follow a detected contour of an object depicted in an input image. In one embodiment, the output of the object detection process includes polylines representing the edges or boundaries of detected features or objects.

Figure 3:
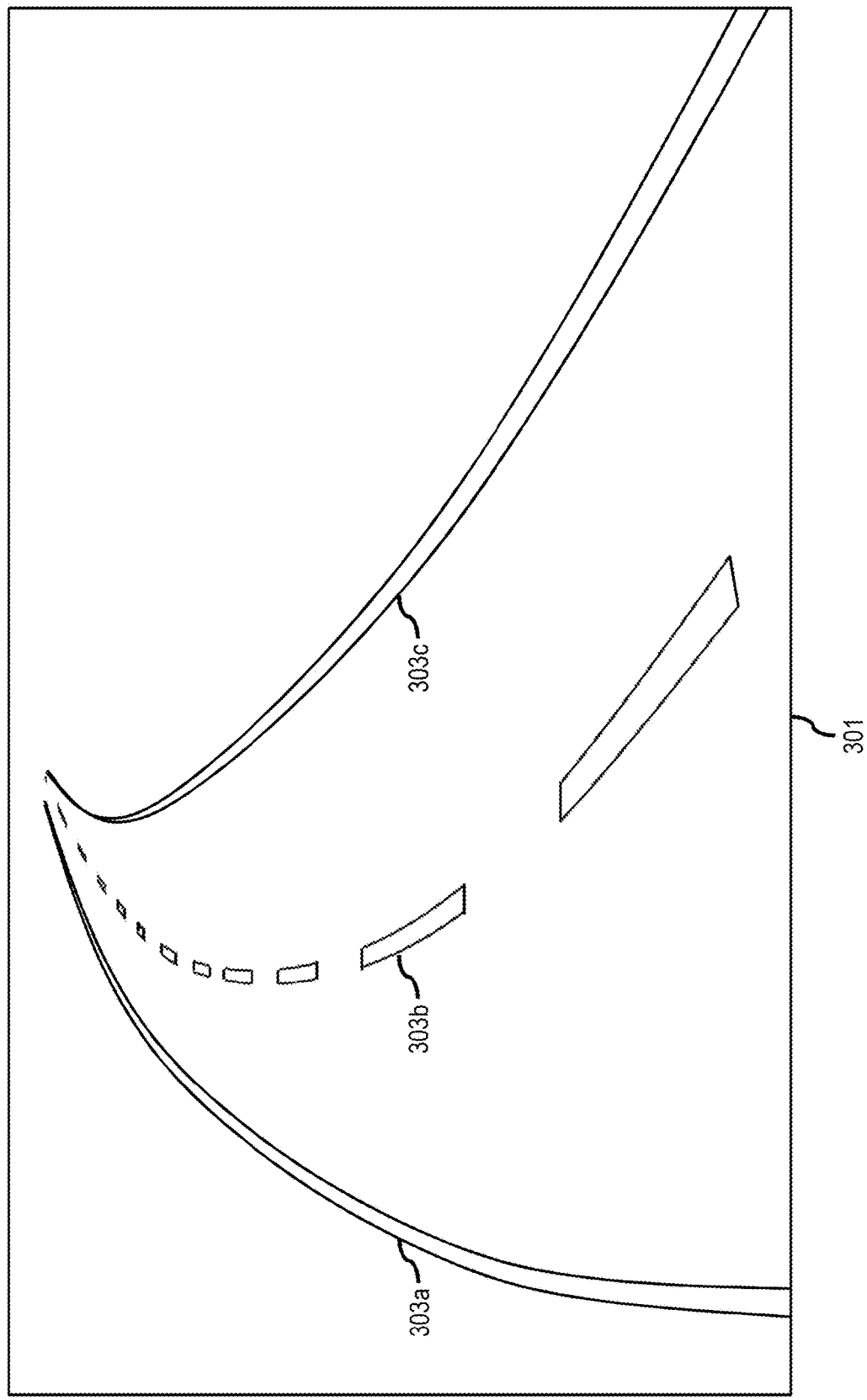
FIG. 3 is a diagram illustrating an example of object detection from an input image by a computer vision system, according to one embodiment.
Figure 4A:
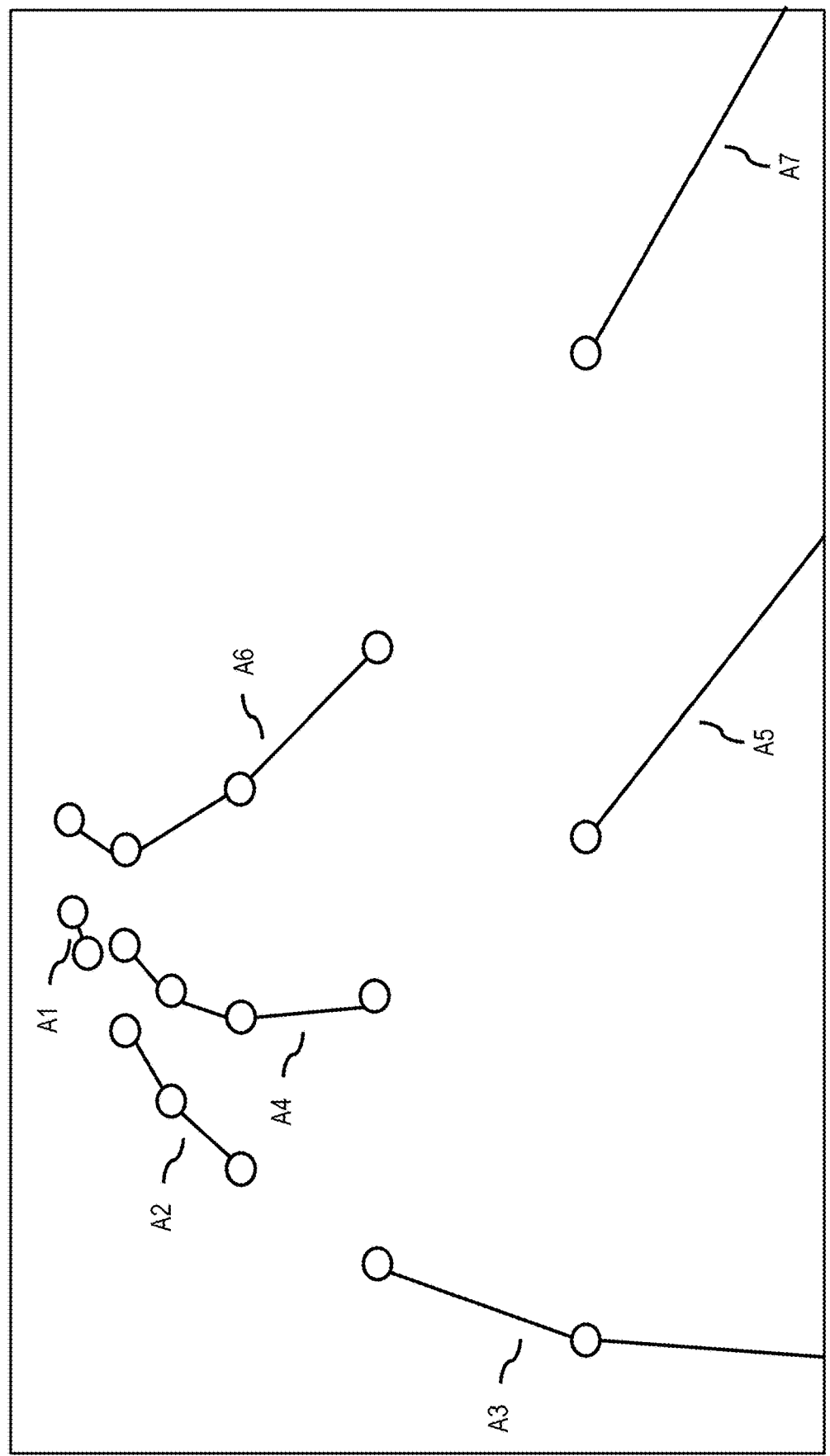
FIGS. 4A and 4B is a diagram respectively illustrating a first and second set of polylines for determining polyline homogeneity, according to one embodiment.
Figure 4B:
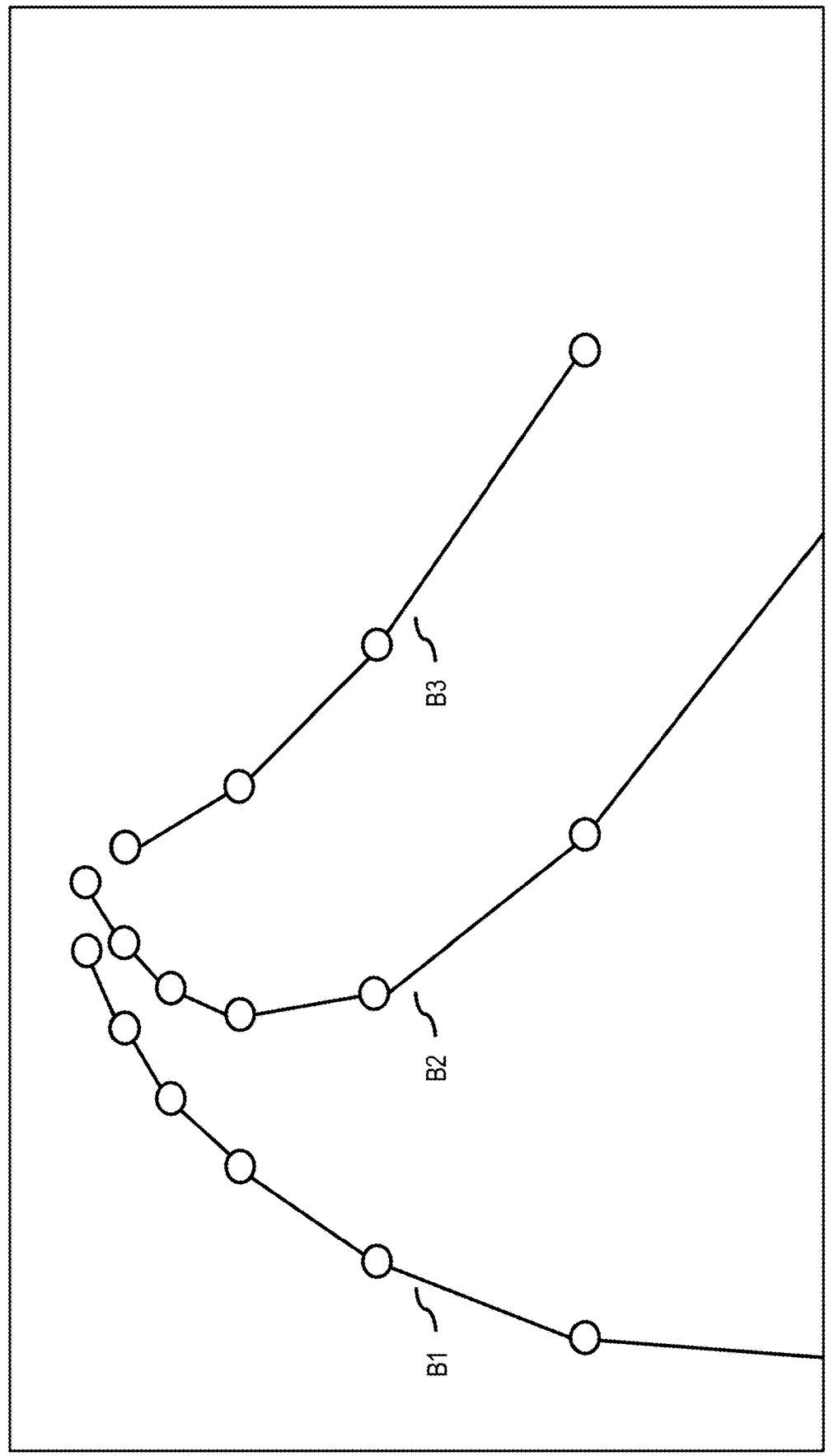

FIG. 3 is a diagram illustrating an example of object detection from an input image 301 by the computer vision system 103, according to one embodiment. In this example, the input image 301 is captured by an onboard forward-looking camera of a vehicle 101a as it travels on a road. This image, for instance, can be captured to perform vehicle localization in support of autonomous driving. As shown, the input image 301 depicts a road with lane lines 303a-303c as the features of interest. To process the input image 301, the computer vision system 103 can use its feature detection processes as described above to generate a polyline set 401 to represent the lane lines 303a-303c as shown in FIG. 4A. In one embodiment, a polyline can be a series of line segments connected at various points that trace the contours of the detected lane lines. In some embodiments, the polylines can include one or more segments that are arc segments or curve segments to more closely follow the contours of a detected feature or object without adding additional connection points.

As shown FIG. 4A, the feature or object detection process may not always result in a complete or continuous polyline representing each polyline. This can occur, for instance, when portions of the input image 301 are degraded (e.g., obscured by obstacles, blurred, affected by shadows, etc.) so that portions of the lane lines 303a-303c may not be detected. As a result, the polyline set 401 is created to include multiple polylines (e.g., polylines A1-A7) and can be stored, for instance, a polyline database 109. In a vehicle localization use case, the generated polyline set 401 can then be compared to a second set of polylines (e.g., polyline set 421 of FIG. 4B). The polyline set 421 can be a reference set retrieved from a geographic database 115 such that the second polyline set 421 is accurately mapped to a known location to enable vehicle localization. Alternatively, the second polyline set 421 can be previous detections of the same or similar features or objects retrieved, for instance, from the polyline database 109.

In step 201 of the process 200, after generating or otherwise retrieving at least two sets of polylines (e.g., the polyline set 401 and the polyline set 421), the computer vision system 103 can render or rasterize the polyline set 401 and the polyline set 421 where the value at each pixel or grid cell of an image grid is an identity of the polyline it is occupied with. The pixels or grid cells with no polyline passing through them are assigned a background identifier. In other words, the computer vision system 103 can render the first polyline set 401 onto a first image grid (e.g., an image with a x by y number of pixels, with each grid cell corresponding to one or more pixels of the image) and render the second set of polylines onto a second image grid. In one embodiment, the first image grid and the second image grid share a grid pattern. For example, the grid pattern may indicate the number of x and y grid cells/pixels that comprise the image grid or image such that a grid cell in the first image grid cell be matched to a corresponding grid cell in the second image grid.

Figure 5A:
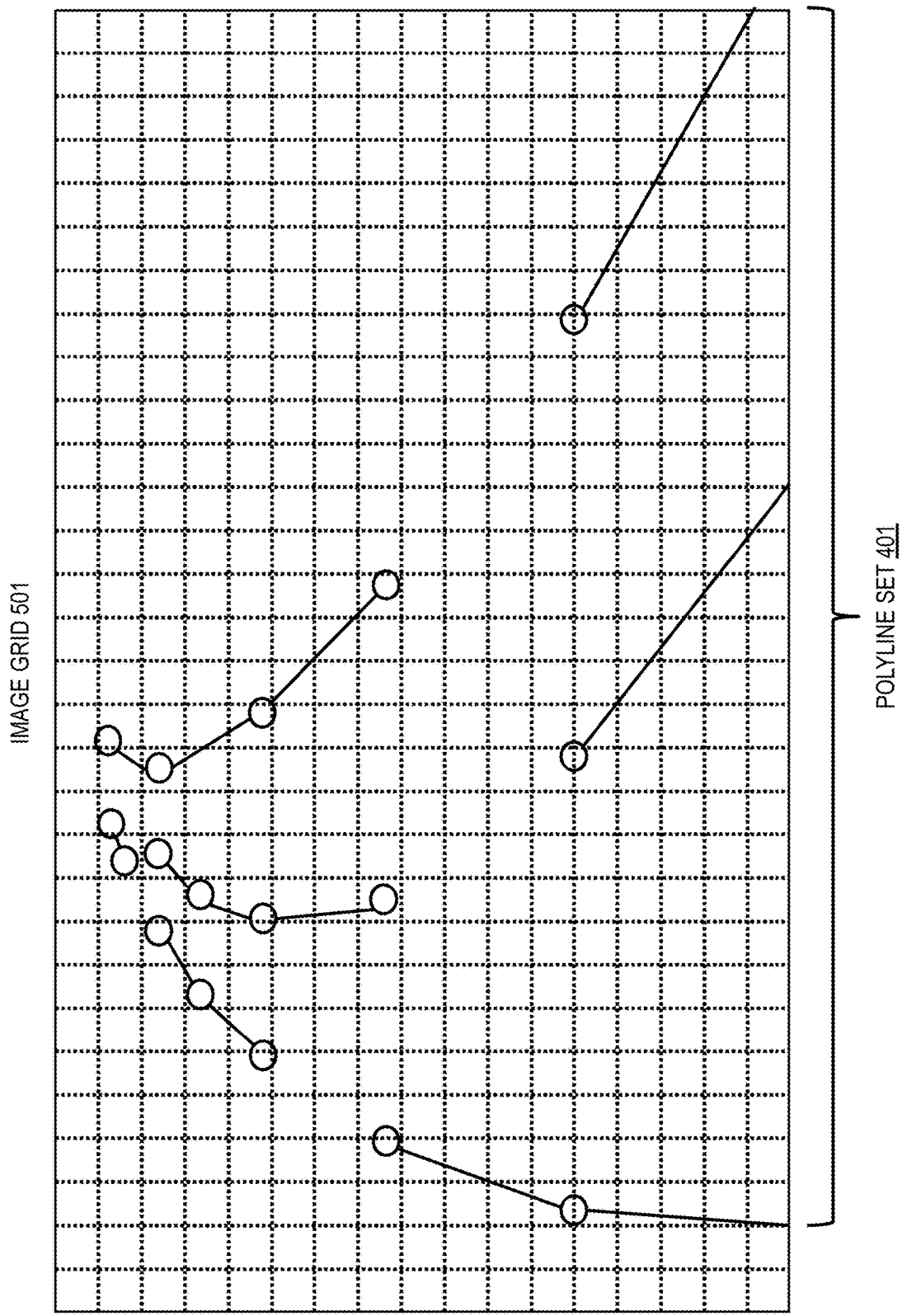
FIGS. 5A-5D are examples of rendering polyline sets for determining polyline homogeneity, according to one embodiment.
Figure 5B:
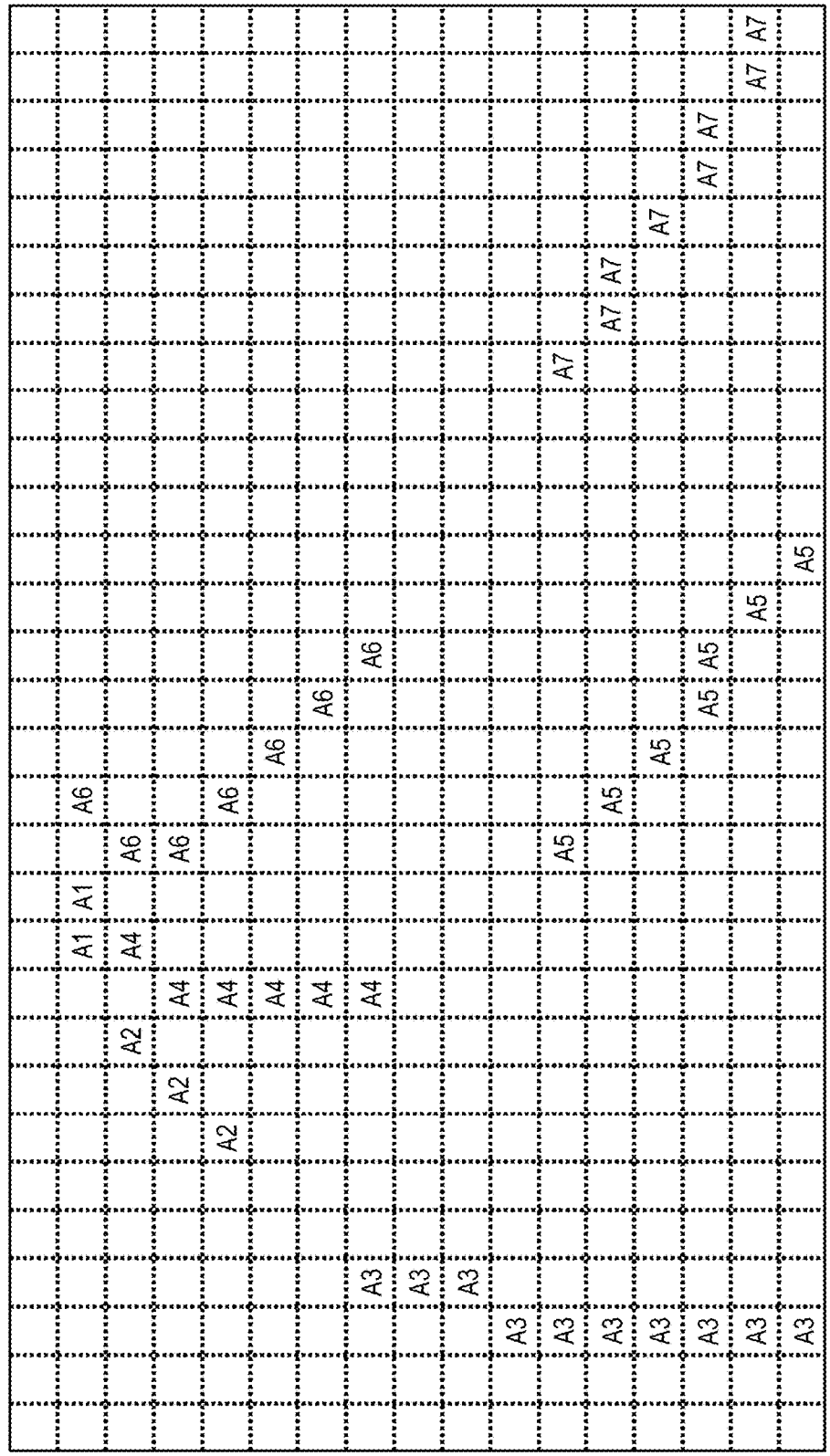

As discussed above, as part of the rendering, the computer vision system 103 labels one or more cells of the first image grid to indicate at least one of the polylines of the first polyline set 401 based on determining that the polyline occupies the one or more first cell. In one embodiment, every polyline in the first polyline set 401 can be rendered. In other embodiments, the computer vision system 103 can select one or a subset of the polylines to render, and need not render all of the polylines. FIGS. 5A and 5B are diagrams illustrating an example rendering the first polyline set 421 onto an image grid 501. In the example of FIG. 5A, the polylines of the first polyline set 401 is superimposed on the image grid 501 to identify the grid cells of the image grid 501 occupied by each polyline. The computer vision system 103 then labels the grid cells of the image grid 501 to identify the polylines for each occupied grid cell. In this example, the grid cells are labeled to identify polylines A1-A7 of the polyline set 401 and indicated as labeled rendering 521 in FIG. 5B. It is noted that if more than one polyline occupies a grid cell, the grid cell can be labeled to indicate multiple occupying polylines. The remaining unoccupied grid cells are left blank in this example, but are nonetheless labeled as background cells.

Figure 5C:
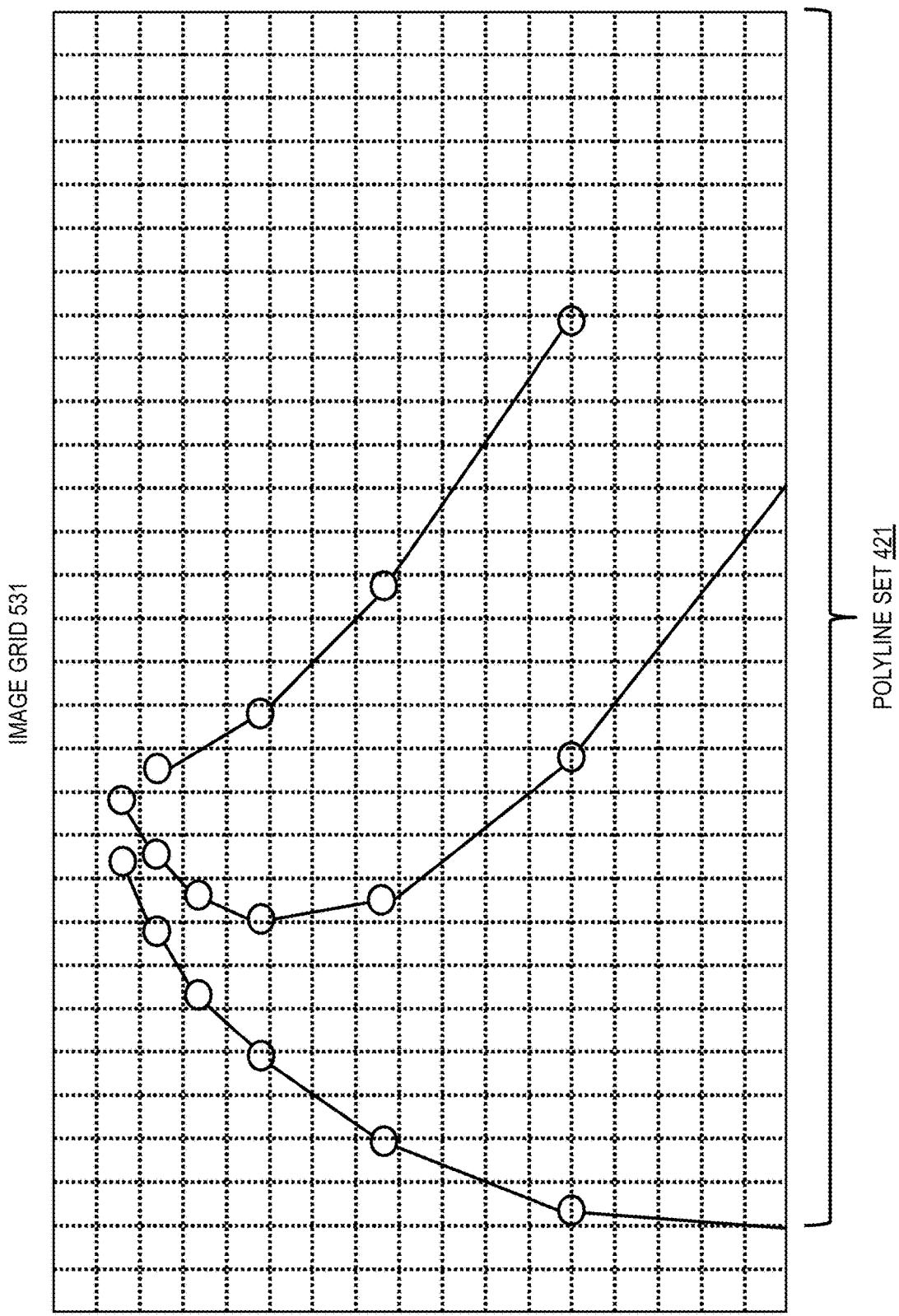
Figure 5D:
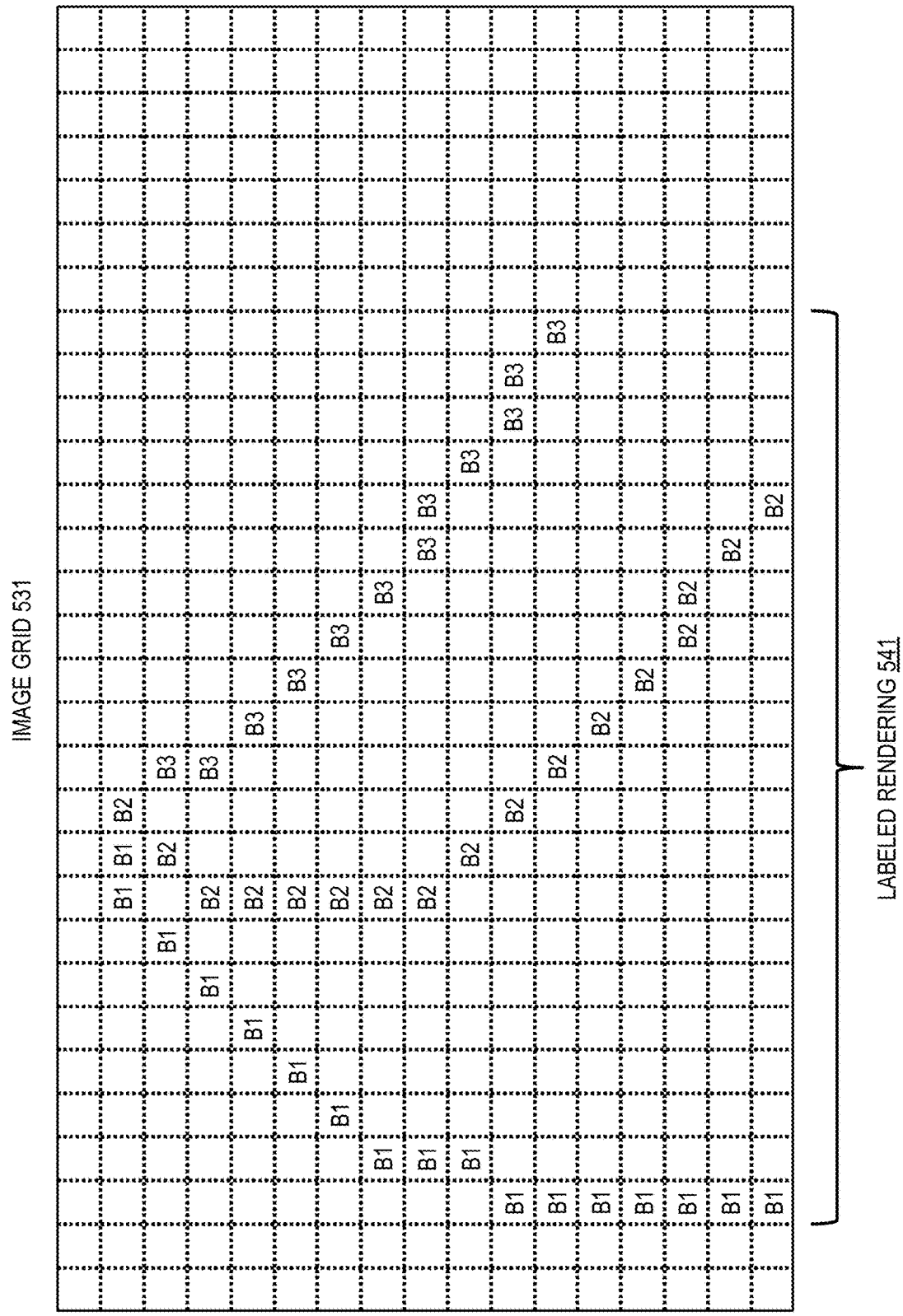

FIGS. 5C and 5D illustrate an analogous example rendering and labeling of the second polyline set 421 onto an image grid 531. The image grid 531 shares the same grid pattern as the image grid 501 to facilitate comparison of the polyline sets 401 and 421. FIG. 5C shows the polylines of polyline set 421 superimposed on the image grid 531. FIG. 5D then shows the labeling of the occupied grid cells of the image grid 531 to indicate the polylines (e.g., polylines B1-B3 of the polyline set 421) for each occupied grid cell to generate labeled rendering 541. As with the examples of FIGS. 5A and 5B, the unoccupied grid cells are labeled as background cells.

In step 203, after rendering and labeling, the computer vision system 103 can optionally determine or choose a grid cell threshold (e.g., a pixel threshold) for determining matching cells between the rendered polyline sets 401 and 421 (e.g., between image grids 501 and 531). This grid cell threshold, for instance, represents a cell distance between candidate cells of the first image grid 501 and the second image grid 531 to determine a match. In one embodiment, a grid threshold can be used in situations where a cell-to-cell or pixel-to-pixel comparison of the polyline sets 401 and 421 can be problematic. For example, in a situation where the rendered polylines in one set are translated by a few pixels or grid cells compared to the other, a cell-to-cell matching approach can potentially report a zero accuracy. In use cases, where the matching is used to confirm lane line detection, the detected lane lines might be marked as potential false positives and report no detections because of the zero-accuracy match due to pixel or cell translation. In one embodiment, to compensate for this condition, the computer vision system 103 can use a selected grid-cell threshold to dilate the labeled renderings of the rendered polylines based on the window size of the selected grid-cell threshold. In this way, neighboring cells within the grid-cell threshold of an occupied grid cell can be labeled with the same polyline identifier as the occupied grid cell. In one embodiment, the grid-cell dilation can be performed on one of the polyline sets 401 and 421 individually, or both sets 401 and 421 together prior to matching of the polyline sets 401 and 421.

Figure 6:
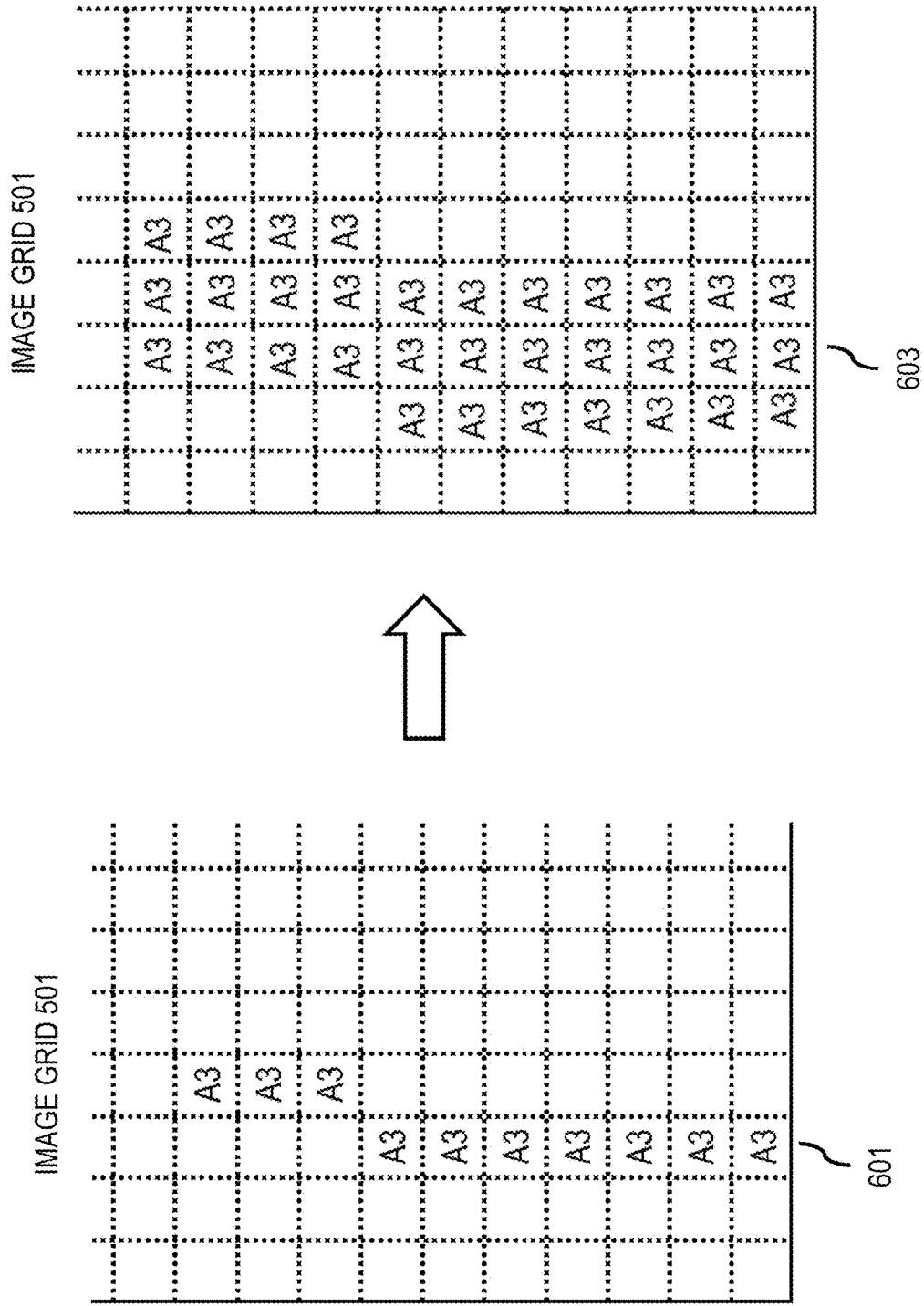
FIG. 6 is a diagram illustrating an example of using a grid cell threshold to dilate a window for determining matching grid cells, according to one embodiment.

FIG. 6 is a diagram illustrating an example of using a grid cell threshold to dilate a window for determining matching grid cells, according to one embodiment. More specifically, FIG. 6 shows a portion of the image grid 501 depending a rendering or a rasterization of the polyline A3 of the polyline set 401. The rendering 601 of the polyline A3 is with no dilation performed. In this example, the computer vision system 103 selects a grid cell threshold of one grid cell, so that the computer vision system 103 dilates the rendering 601 by one grid along both the x axis and y axis of the image grid 501. This dilation generates the dilated rendering 603 that labels cells neighboring the labeled grid cells of the rendering 601 with the same polyline A3 as the original rendering 601. This dilation effectively expands the grid-cell area that can be used to match against the other polyline set 421 to advantageously provide a larger matching window to mitigate any potential grid-cell or pixel translation effects.

In step 205, after rendering, labeling, and optionally dilation, the computer vision system 103 initiates a matching process between the labeled rendering 521 of the first polyline set 401 and the labeled rendering 541 of the second polyline set 421. In one embodiment, for every polyline or a subset of polylines in the first polyline set 401, the computer vision system 103 identifies the grid cells or pixels of the labeled rendering 521 of the polyline set 401 that correspond to each polyline or the subset of polylines in the first polyline set 401. The computer vision system 103 then finds the labeled polyline identifier of the corresponding grid cell or pixel of the labeled rendering 541 of the second polyline set 421. In other words, the computer vision system 103, for each polyline (e.g., polylines A1-A7) in the first set of polylines 401, determines one or more matching cells from among the grid cells of the labeled rendering 541 of the second polyline set 421 that matches or corresponds to the cells of the labeled rendering 521 of the first polyline set 401. By way of example, a cell corresponds or matches between sets if the cell has the same x and y coordinates within the image grid 501 of the first polyline set 401 (or relative x and y coordinates) as another cell in the image grid 531 of the second polyline set 421.

Figure 7A:
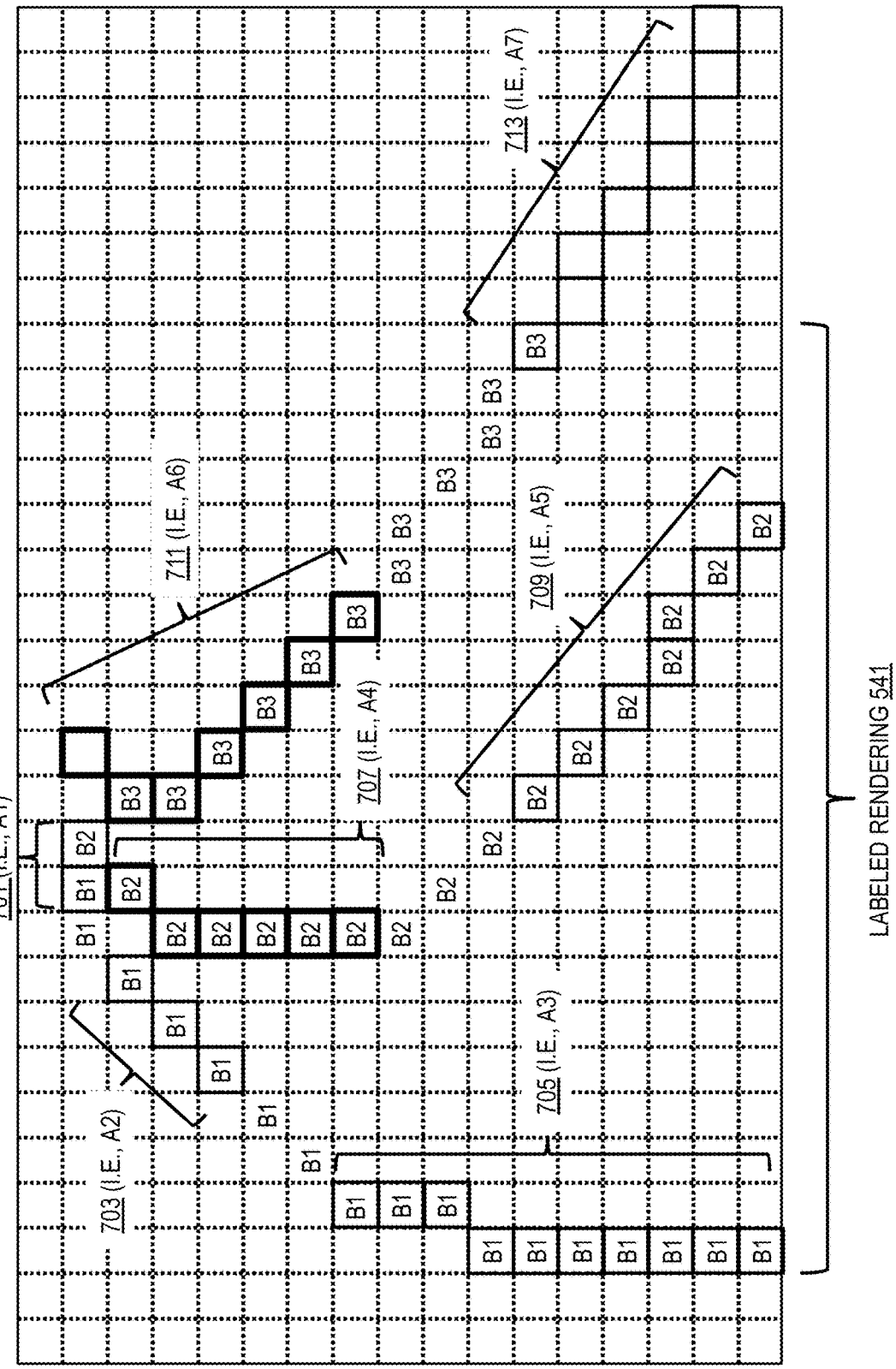

FIG. 7A illustrates an example matching the first polyline set 401 to the second polyline set 421 to determine homogeneity of the first polyline set 401 with respect to the second polyline set 421, according to one embodiment. In the example of FIG. 7A, grid cells corresponding to each polyline A1-A7 are depicted in outline overlaid onto the labeled rendering 541 of the image grid 531 for the second polyline set 421. As shown, outline grouping 701 corresponds to polyline A1, outline grouping 703 corresponds to polyline A2, outline grouping 705 corresponds to polyline A3, outline grouping 707 corresponds to polyline A4, outline grouping 709 corresponds to polyline A5, outline grouping 711 corresponds to polyline A6, and outline grouping 713 corresponds to polyline A7.

In step 207, the computer vision system 103 determines the percent composition for each polyline A1-A7 of the first polyline set 401 with respect the labeled rendering 541 of the second polyline set 421. In one embodiment, the percent composition indicates a respective percentage of each of the polylines B1-B3 of the second polyline set 421 occupying the matching cells for each polyline A1-A7 based on the labeling of the labeled rendering 541 of the second polyline set 421. Table 1 below illustrates a count of the polylines B1-B3 that occupies grid cells matching the polylines A1-A7. Background cells of the second polyline set 421 are also counted and included in the percent composition determination. The first column of Table 1 identifies the polylines of the first polyline set 401 and the first row identifies the polylines and background of the second polyline set 421 as well as the total grid cells occupied by each polyline of the first polyline set 401.

TABLE 1

|    | B1 | B2 | B3 | Background | Total Cells |
|----|----|----|----|------------|-------------|
| A1 | 1  | 1  | 0  | 0          | 2           |
| A2 | 3  | 0  | 0  | 0          | 3           |
| A3 | 10 | 0  | 0  | 0          | 10          |
| A4 | 0  | 6  | 0  | 0          | 6           |
| A5 | 0  | 7  | 0  | 0          | 7           |
| A6 | 0  | 0  | 6  | 1          | 7           |
| A7 | 0  | 0  | 1  | 7          | 8           |

In one embodiment, the percent composition can then be calculated from the cell counts shown in Table 1. Table 2 presents the determined percent composition of the first polyline set 401 with respect to the second polyline set 421. The percent composition can then be used as a metric to represent the homogeneity or purity of the first polyline set with respect to the second polyline set 421.

TABLE 2

|    | B1   | B2   | B3  | Background | Total Cells |
|----|------|------|-----|------------|-------------|
| A1 | 50%  | 50%  | 0   | 0          | 2           |
| A2 | 100% | 0    | 0   | 0          | 3           |
| A3 | 100% | 0    | 0   | 0          | 10          |
| A4 | 0    | 100% | 0   | 0          | 6           |
| A5 | 0    | 100% | 0   | 0          | 7           |
| A6 | 0    | 0    | 86% | 14%        | 7           |
| A7 | 0    | 0    | 12% | 88%        | 8           |

In one embodiment, the purer or homogenous the composition is, the higher the quality of matching/registration (e.g., for localization and mapping). For example, polylines A2, A3, A4, and A5 have 100% composition by a single polyline from the second polyline set 421, indicating that they are homogeneous or pure with respect to the second polyline set 421. However, polyline A7 has a high percentage of a background class from the second polyline set 421, indicating a potential false positive or a potential that the second polyline set 421 is missing a feature. It is noted that the percent composition calculation illustrated above is provided by way of illustration and not limitation. It is contemplated that any other means of calculating percent composition from the matching results can be used including, but not limited to: highest weighted component (e.g., polyline) among non-background classes, the entropy of the distribution of polylines, and/or the like.

In step 209, the computer vision system 103 can optionally calculate the polyline homogeneity of the second polyline set 421 with respect to the first polyline set 401 by returning repeating the steps 205 and 209. As previously discussed, the asymmetric nature of the homogeneity metric of the embodiments described herein makes it likely that calculating homogeneity from the opposite perspective will yield different results. For example, as shown in FIG. 7B, for each polyline B1-B3 in the second polyline set 421, the computer vision system 103 can determine one or more other matching cells from among the labeled rendering 521 of the image grid 501 for the first polyline set 401 that corresponds to cells of the polylines of the first polyline set 401. In the example of FIG. 7B, outline grouping 721 corresponds to polyline B1, outline grouping 723 corresponds to polyline B2, and outline grouping 725 corresponds to polyline B3. As previously discussed, the asymmetric nature of the homogeneity metric of the embodiments described herein makes it likely that calculating homogeneity from the opposite perspective will yield different results. FIG. 7B illustrates an example matching the first polyline set 401 to the second polyline set 421 to determine homogeneity of the first polyline set 401 with respect to the second polyline set 421, according to one embodiment. Table 3 below presents the counts of the polylines A1-A7 that occupies grid cells matching polylines B1-B3.

TABLE 3

|    | A1 | A2 | A3 | A4 | A5 | A6 | A7 | Background | Total Cells |
|----|----|----|----|----|----|----|----|------------|-------------|
| B1 | 1  | 3  | 10 | 0  | 0  | 0  | 0  | 3          | 17          |
| B2 | 1  | 0  | 0  | 6  | 7  | 0  | 0  | 3          | 17          |
| B3 | 0  | 0  | 0  | 0  | 0  | 6  | 1  | 5          | 12          |

TABLE 4

|    | A1 | A2  | A3  | A4  | A5  | A6  | A7 | Background | Total Cells |
|----|----|-----|-----|-----|-----|-----|----|------------|-------------|
| B1 | 5% | 18% | 59% | 0   | 0   | 0   | 0  | 18%        | 17          |
| B2 | 6% | 0   | 0   | 35% | 41% | 0   | 0  | 18%        | 17          |
| B3 | 0  | 0   | 0   | 0   | 0   | 50% | 8% | 42%        | 12          |

As illustrated in Tables 3 and 4, the homogeneity or purity of the second polyline set 421 with respect to the first polyline set 401 is lower than vice versa. This indicates, for instance, that at least some of the polylines of the first polyline set 401 are likely to be disconnected portions of the more complete polylines of the second polyline set 421. This result can be more likely when the second polyline set 421 is a reference set against which the first polyline set 401 is matched.

Figure 8A:
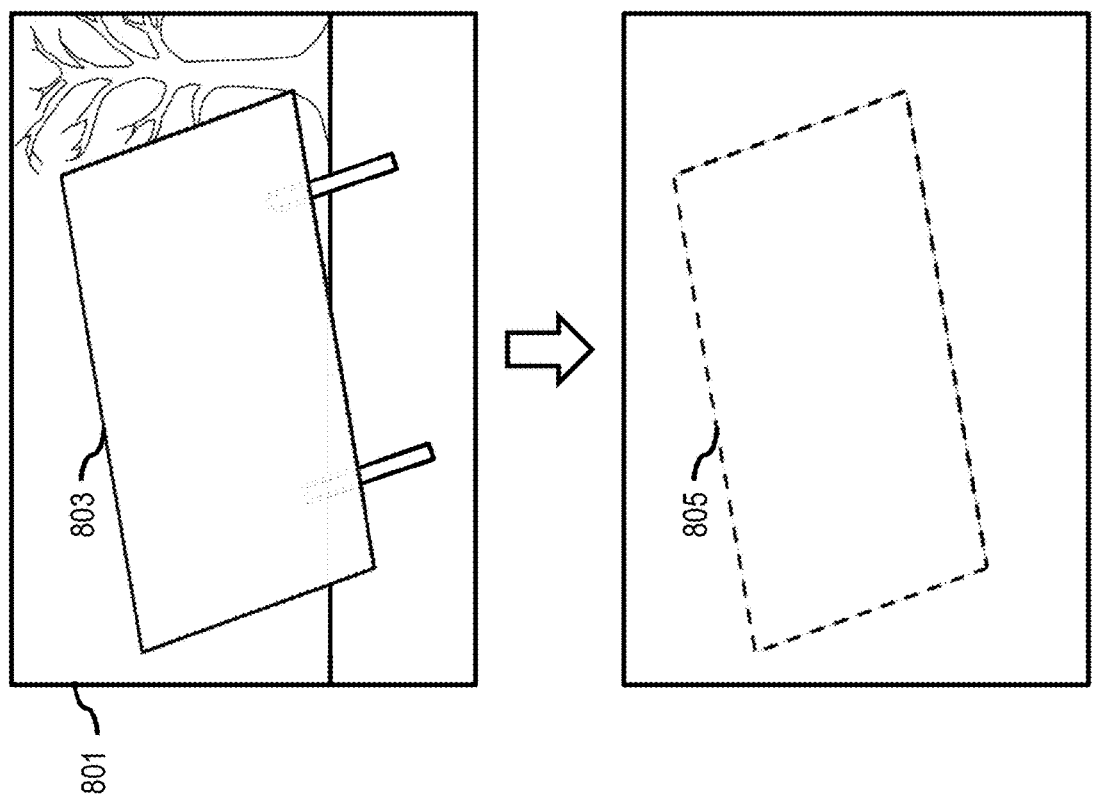
FIGS. 8A and 8B are examples of determining homogeneity for polygons, according to one embodiment.
Figure 8B:
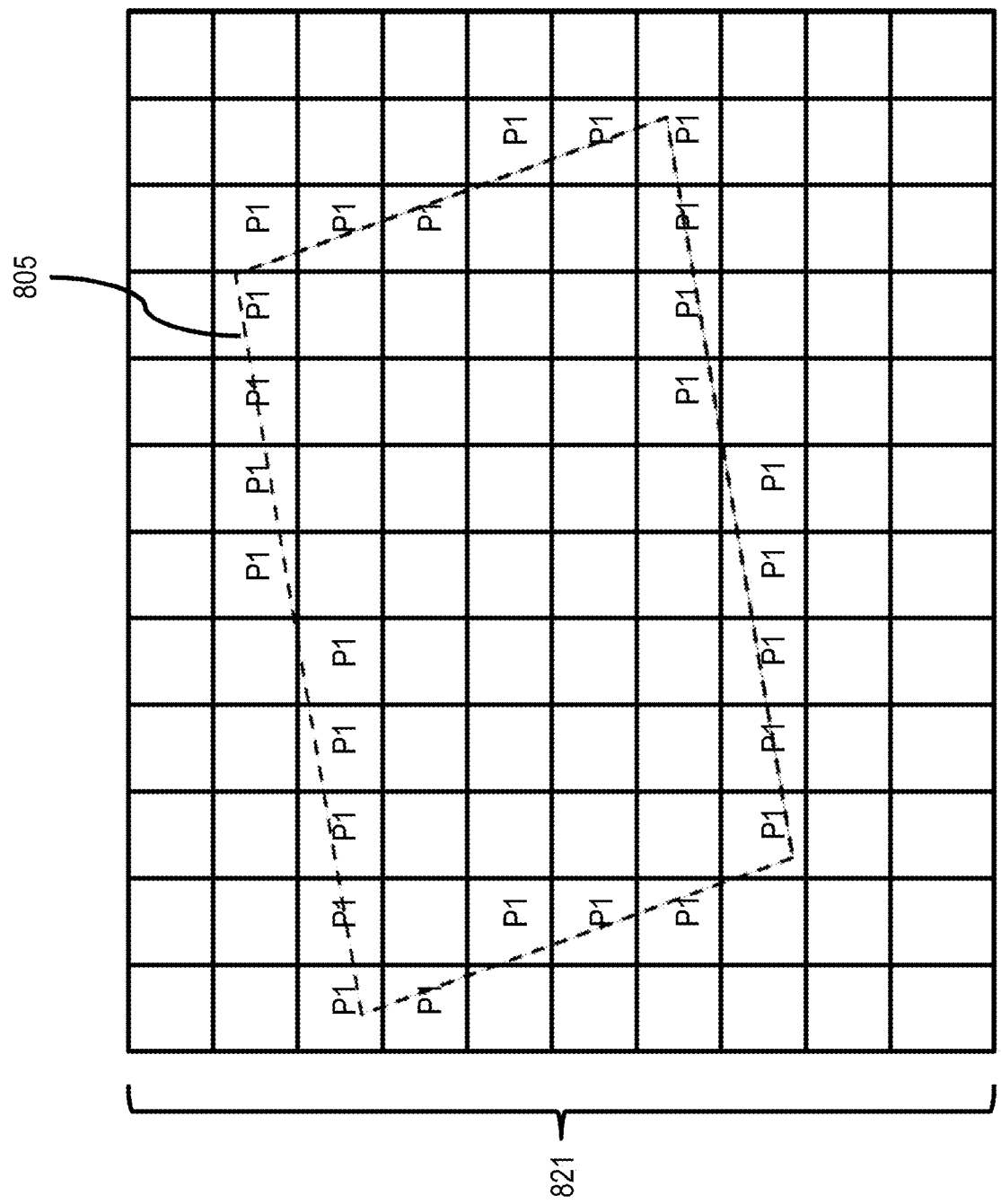

As previously discussed, the various embodiments described herein are applicable to other types of object representations than polylines. For example, FIGS. 8A and 8B are examples of determining homogeneity for polygons, according to one embodiment. FIG. 8A illustrates an input image 801 depicting a sign 803 that can be represented as a polygon. In one embodiment, the input image 801 can be processed by the computer vision system 103 to identify pixels of the image corresponding to the sign 803 (e.g., the object of interest). In this example, the computer vision system 103 uses machine learning (e.g., the RNN 105 and/or CNN 107) or other equivalent processes to classify each pixel of the input image 801 as belonging to the depicted sign 803 or belonging to other objects/features depicted in the image (e.g., ground, sky, or trees). The computer vision system 103 can then generate a rasterized or rendered image 821 of the polygon 805 and label the grid cells or pixels of the rendered image 821 with an identifier of the polygon 805 according to the various embodiments described herein. After rendering the polygon 805, the computer vision system 103 can then retrieve and render a reference polygon or polygon set for matching and determining polygon homogeneity or purity in analogous fashion according to the various embodiments described herein.

Figure 9A:
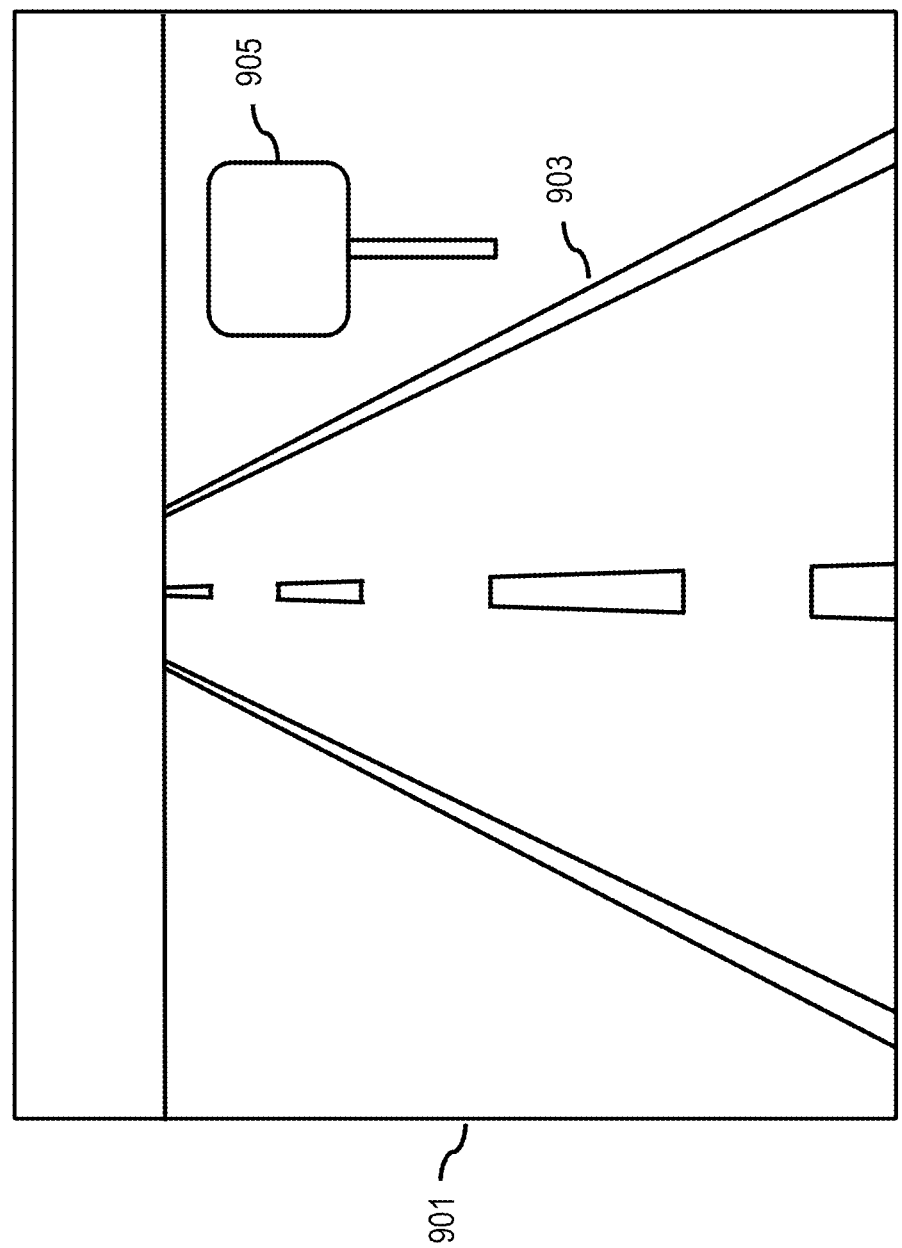
FIGS. 9A and 9B are diagrams illustrating an example use case of determining polyline homogeneity for vehicle localization using visual odometry, according to one embodiment.
Figure 9B:
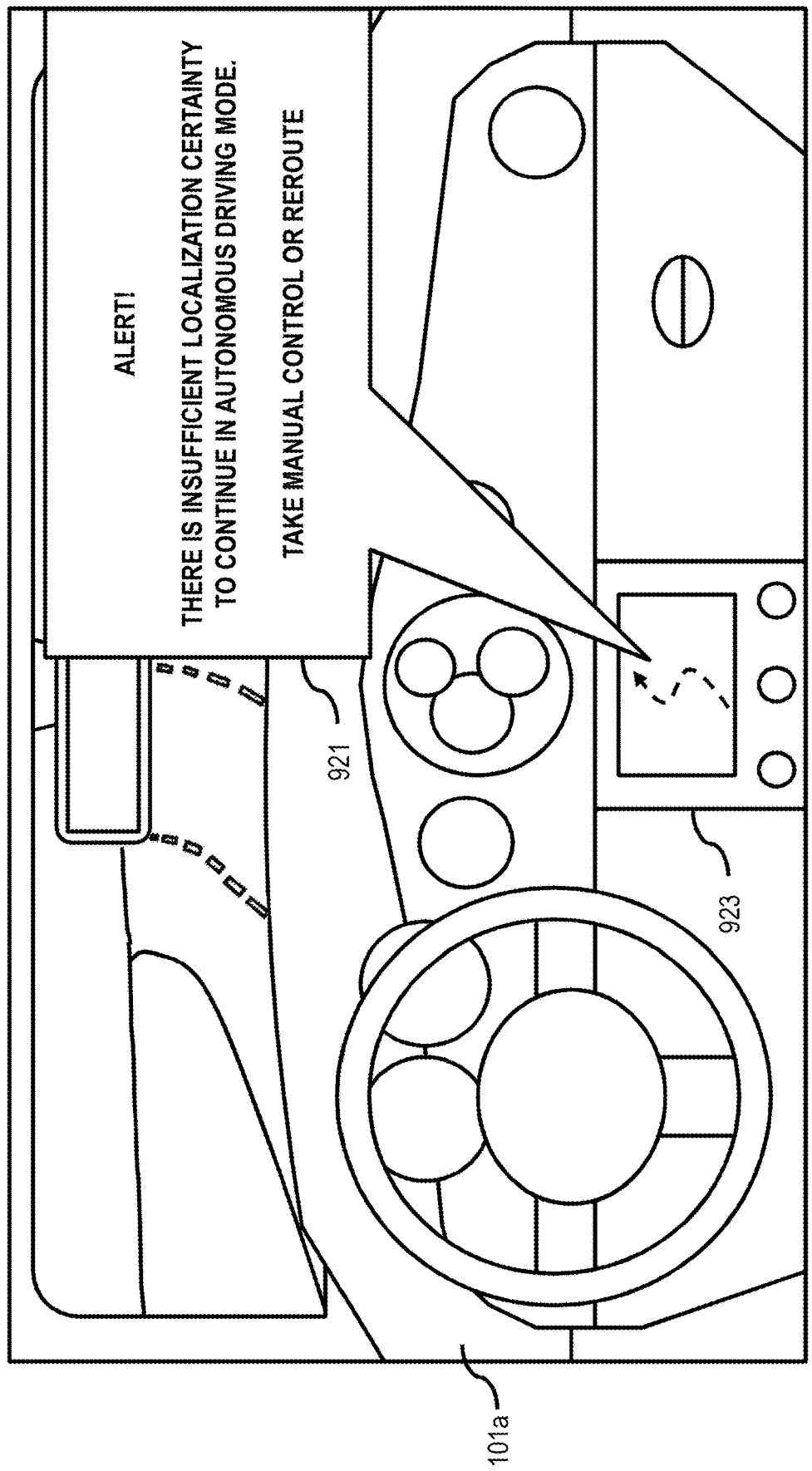

The embodiments of evaluating polygon similarity described herein can be used for any number of object detection use cases. FIGS. 9A and 9B are diagrams illustrating an example use case of a determining polyline homogeneity for vehicle localization using visual odometry, according to one embodiment. Understanding a vehicle's location on a map enables planning of a route, both on fine and coarse scales. Such an understanding is particularly important for autonomous driving where high accuracy and real-time localization of vehicles (e.g., a vehicle 101a) are needed. As previously discussed, for autonomous driving and other similar use cases, a localization accuracy of around 10 cm is needed for safe driving. One way to achieve this level of accuracy is to use visual odometry, in which features or object are detected from imagery. These features can then be matched to a database of features to determine the vehicle's position location. In one embodiment, this matching can be performed by comparing the detected object against reference or ground-truth objects with known camera poses (e.g., a location, angle, tilt, orientation, etc. of a camera mounted on the vehicle 101a that is capturing images to process for visual odometry).

As shown, FIG. 9A illustrates an image 801 captured by a camera of a vehicle 101a traveling on a roadway. The computer vision system 103 detects an object of interest (e.g., lane markings 903 or a road sign 905) in the image whose location is known (e.g., location stored in geographic database 115) and that can be used for visual odometry. The computer vision system 103 recognizes the lane markings 903 and/or the road sign 905 and creates a polyline or polygonal representation the detected features or objects. The computer vision system 103 can then retrieve ground truth representations (e.g., reference polylines or polygons) that depict the known lane markings 903 and/or road sign 905 from different known camera poses. For example, the ground truth representations can include polylines representing the lane markings 903 as the markings 903 would appear from a known distance and camera pose. The computer vision system 100 then determines the polyline homogeneity of between the recognized polyline representations and the reference polylines of the lane markings 903 to facilitate vehicle localization.

In one embodiment, if the determined polyline homogeneity is above a threshold value the vehicle localization or registration against the known the location of the reference polylines can be relied on to navigate autonomously. However, as shown in FIG. 9B, if the polyline homogeneity is below a threshold value, a vehicle 101a that is operating in an autonomous driving mode can be configured to present an alert 921 that the computer vision system 103 is unable to achieve desired level of confidence or certainty (e.g., based on the determined homogeneity or purity) about a vehicle localization result. Accordingly, the vehicle 101a can be configured to automatically exit an autonomous driving mode (e.g., after warning the driver) and operate in manual mode (e.g., a mode requiring at least partial driver control and operation of the vehicle 101a). Alternatively, as shown, the vehicle 101 (e.g., via a vehicle display 923) can present the driver with an option to take manual control or to reroute to a road that can provide improved detected feature homogeneity for vehicle localization.

Returning to FIG. 1, as shown, the system 100 includes the computer vision system 103 configured to detect objects as polylines and/or polygon and to evaluate the homogeneity/purity of the polylines or polygons according to the various embodiments described herein. In one embodiment, the computer vision system 103 includes or is otherwise associated with one or more machine learning networks for feature or object detection from image data (e.g., the CNN 107 for generating object feature maps from input images, and the RNN 105 for traversing the feature map to iteratively and directly output coordinates of the contours of the objects as polylines, polygons, polygon vertices, etc.). In one embodiment, the computer vision system 103 includes sensors (e.g., camera sensors) and related components for automatically detecting objects of interest in image data. The computer vision system 103 can be a standalone component or can be incorporated into any of the vehicle 101a, surveillance device 101b, IoT device 101c, and/or any other device capable of visual object detection.

In one embodiment, at least one machine learning network of the computer vision system 103 is a traditional convolutional neural network (e.g., the CNN 107) which consists of multiple layers of collections of one or more neurons (e.g., processing nodes of the neural network) which are configured to process a portion of an input image. In one embodiment, the receptive fields of these collections of neurons (e.g., a receptive layer) can be configured to correspond to the area of an input image delineated by a respective a grid cell generated as described above. In addition, the computer vision system 103 can also include a recurrent neural network in which connections between nodes or neurons of the network form a directed cycle to enable dynamic temporal behavior. In contrast to convolutional neural networks, recurrent neural networks have internal memories that can store sequential information or inputs to generate output features. It is contemplated that any type of recurrent neural network can be used with the embodiments described herein including, but not limited to: (1) recursive neural networks including tensor-based recursive neural networks that enable traversing of graph-like structures in topological order; (2) a fully recurrent network comprising neurons or nodes with a directed connection to each other neuron or node; etc.

In one embodiment, the computer vision system 103 also has connectivity or access to a polyline database 109 for storing or retrieving polyline and/or polygonal representations of objects of interest. By way of example, each polyline or polygon representation can be stored in the polyline database 109 as a data record or structure comprising a list of (x, y) coordinates indicate the vertices of the polyline or polygon. In one embodiment, the computer vision system 103 also has connectivity the geographic database 115 which stores representations of mapped geographic features to facilitate visual odometry to increase localization accuracy. The geographic database 115 can also store polyline or polygonal representations of ground truth or reference objects (e.g., signs, road markings, lane lines, buildings, landmarks, etc.) that can be detected for visual odometry and/or other mapping related functions.

In one embodiment, the computer vision system 103 has connectivity over a communication network 117 to the services platform 111 that provides one or more services 113. By way of example, the services 113 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 113 uses the output of the computer vision system 103 (e.g., polyline homogeneity determinations, object detections, lane line coordinates, polylines, lane attribute, lane features, etc.) to localize the vehicle 101a or a user equipment 119 (e.g., a portable navigation device, smartphone, portable computer, tablet, etc.) to provide services 113 such as navigation, mapping, other location-based services, etc.

In one embodiment, the computer vision system 103 may be a platform with multiple interconnected components. The computer vision system 103 may include multiple servers, intelligent networking devices, computing devices, components and corresponding software for asymmetric evaluation of polygon similarity according to the various embodiments described herein. In addition, it is noted that the computer vision system 103 may be a separate entity of the system 100, a part of the one or more services 113, a part of the services platform 111, or included within the vehicle 101a, surveillance device 101b, IoT device 101c, and/or UE 119.

In one embodiment, content providers 121a-121m (collectively referred to as content providers 121) may provide content or data (e.g., including geographic data, parametric representations of mapped features, etc.) to the geographic database 115, the computer vision system 103, the services platform 111, the services 113, the UE 119, the vehicle 101a, and/or an application 123 executing on the UE 119. The content provided may be any type of content, such as polyline or polygonal representations of features/objects (e.g., including ground truth polylines or polygons), map content, textual content, audio content, video content, image content, etc. In one embodiment, the content providers 121 may provide content that may aid in determining polyline homogeneity according to the various embodiments described herein. In one embodiment, the content providers 121 may also store content associated with the polyline database 109, geographic database 115, computer vision system 103, services platform 111, services 113, UE 119, vehicle 101a, surveillance device 101b, IoT device 101c, and/or any other client device of the computer vision system 103. In another embodiment, the content providers 121 may manage access to a central repository of data, and offer a consistent, standard interface to data, such as a repository of the geographic database 115.

In one embodiment, the UE 119, vehicle 101a, surveillance device 101b, and/or IoT device 101c may execute the software application 123 to detect features/objects in images and/or determine polyline homogeneity according the embodiments described herein. By way of example, the application 123 may also be any type of application that is executable on UE 119, vehicle 101a, surveillance device 101b, and/or IoT device 101c, such as autonomous driving applications, mapping applications, location-based service applications, navigation applications, device control applications, content provisioning services, camera/imaging application, media player applications, social networking applications, calendar applications, and the like. In one embodiment, the application 123 may act as a client for the computer vision system 103 and perform one or more functions associated with determining polyline homogeneity alone or in combination with the computer vision system 103.

By way of example, the UE 119, vehicle 101a, surveillance device 101b, and/or IoT device 101c, is or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 119, vehicle 101a, surveillance device 101b, and/or IoT device 101c can support any type of interface to the user (such as "wearable" circuitry, etc.). In one embodiment, the UE 119 may be associated with or be a component of the vehicle 101a, surveillance device 101b, and/or IoT device 101c.

In one embodiment, the UE 119, vehicle 101a, surveillance device 101b, and/or IoT device 101c are configured with various sensors for generating or collecting environmental image data (e.g., for the computer vision system 103), related geographic data, etc. In one embodiment, the sensed data represent sensor data associated with a geographic location or coordinates at which the sensor data was collected, and the polyline or polygonal representations of detected objects of interest derived therefrom. By way of example, the sensors may include a global positioning sensor for gathering location data (e.g., GPS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 119, vehicle 101a, surveillance device 101b, and/or IoT device 101c may include light sensors, orientation sensors augmented with height sensors and acceleration sensor (e.g., an accelerometer can measure acceleration and can be used to determine orientation of the vehicle), tilt sensors to detect the degree of incline or decline (e.g., slope) of the vehicle along a path of travel, moisture sensors, pressure sensors, etc. In a further example embodiment, sensors about the perimeter of the UE 119, vehicle 101a, surveillance device 101b, and/or IoT device 101c may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 119, vehicle 101a, surveillance device 101b, and/or IoT device 101c may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof. By way of example, the computer vision system 103, services platform 111, services 113, UE 119, vehicle 101a, surveillance device 101b, IoT device 101c, and/or content providers 121 communicate with each other and other components of the system 100 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
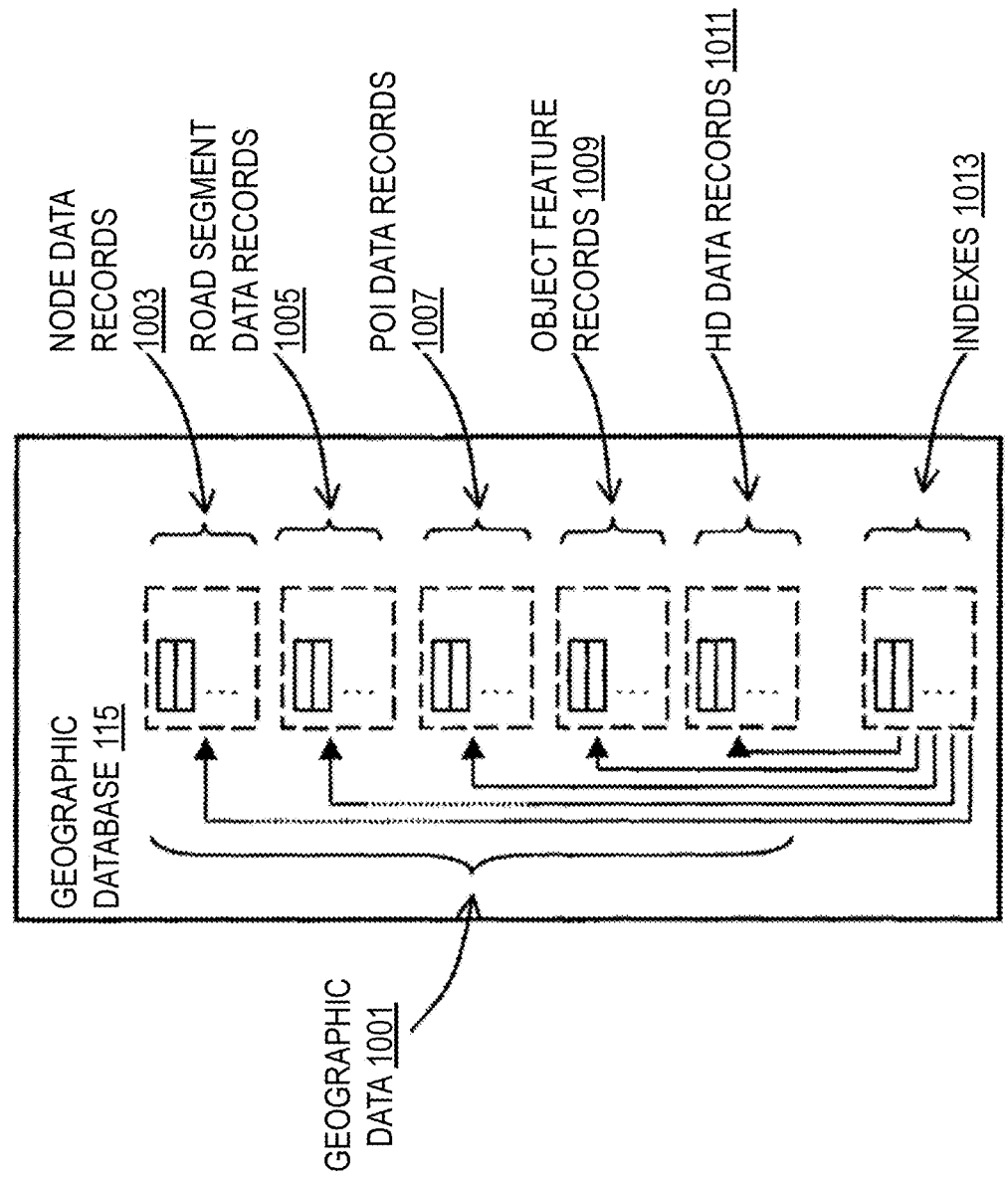
FIG. 10 is a diagram of a geographic database, according to one embodiment.

FIG. 10 is a diagram of a geographic database, according to one embodiment. In one embodiment, the geographic database 115 includes geographic data 1001 used for (or configured to be compiled to be used for) mapping and/or navigation-related services, such as for visual odometry based on polyline homogeneity determined according to the embodiments described herein. In one embodiment, the geographic database 115 include high definition (HD) mapping data that provide centimeter-level or better accuracy of map features. For example, the geographic database 115 can be based on Light Detection and Ranging (LiDAR) or equivalent technology to collect billions of 3D points and model road surfaces and other map features down to the number lanes and their widths. In one embodiment, the HD mapping data (e.g., HD data records 1011) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 115.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 115 follows certain conventions. For example, links do not cross themselves and do not cross each other except at a node. Also, there are no duplicated shape points, nodes, or links. Two links that connect each other have a common node. In the geographic database 115, overlapping geographic features are represented by overlapping polygons. When polygons overlap, the boundary of one polygon crosses the boundary of the other polygon. In the geographic database 115, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 115 includes node data records 1003, road segment or link data records 1005, POI data records 1007, object feature records 1009, HD mapping data records 1011, and indexes 1013, for example. More, fewer or different data records can be provided. In one embodiment, additional data records (not shown) can include cartographic ("cartel") data records, routing data, and maneuver data. In one embodiment, the indexes 1013 may improve the speed of data retrieval operations in the geographic database 115. In one embodiment, the indexes 1013 may be used to quickly locate data without having to search every row in the geographic database 115 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points corresponding to the respective links or segments of the road segment data records 1005. The road link data records 1005 and the node data records 1003 represent a road network, such as used by vehicles, cars, and/or other entities. Alternatively, the geographic database 115 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 can include data about the POIs and their respective locations in the POI data records 1007. The geographic database 115 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 115 can also include object feature records 1009 for storing objects of interest (e.g., as polygonal, polyline, and/or parametric representations) that can be used for visual odometry according to the various embodiments described herein. In one embodiment, the geographic database 115 can also store the data related to determining polyline homogeneity and/or historically calculated homogeneity values. By way of example, the object feature records 1009 can be associated with one or more of the node records 1003, road segment records 1005, and/or POI data records 1007 to support localization or visual odometry based on the features stored therein and the corresponding estimated quality of the features. In this way, the object feature records 1009 can also be associated with the characteristics or metadata of the corresponding record 1003, 1005, and/or 1007.

In one embodiment, as discussed above, the HD mapping data records 1011 model road surfaces and other map features to centimeter-level or better accuracy (e.g., including centimeter-level accuracy for ground truth objects used for visual odometry based on polyline homogeneity according to the embodiments described herein). The HD mapping data records 1011 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 1011 are divided into spatial partitions of varying sizes to provide HD mapping data to the UE 119, vehicle 101*a*, surveillance device 101*b*, IoT device 101*c*, and/or other end user devices with near real-time speed without overloading the available resources of the devices (e.g., computational, memory, bandwidth, etc. resources).

In one embodiment, the HD mapping data records 1011 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1011.

In one embodiment, the HD mapping data records 1011 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., include detected polylines/polygon representations) also at centimeter-level accuracy. Other sensor data can include vehicle telemetry or operational data such as windshield wiper activation state, braking state, steering angle, accelerator position, and/or the like.

In one embodiment, the geographic database 115 can be maintained by the content provider 121 in association with the services platform 111 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle (e.g., vehicle 101*a* and/or UE 119) along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 101*a* or UE 119, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for determining polyline homogeneity may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 11 illustrates a computer system 1100 upon which an embodiment of the invention may be implemented. Computer system 1100 is programmed (e.g., via computer program code or instructions) to determine polyline homogeneity as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to determining polyline homogeneity. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for determining polyline homogeneity. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for determining polyline homogeneity, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 117 for determining polyline homogeneity.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 12:
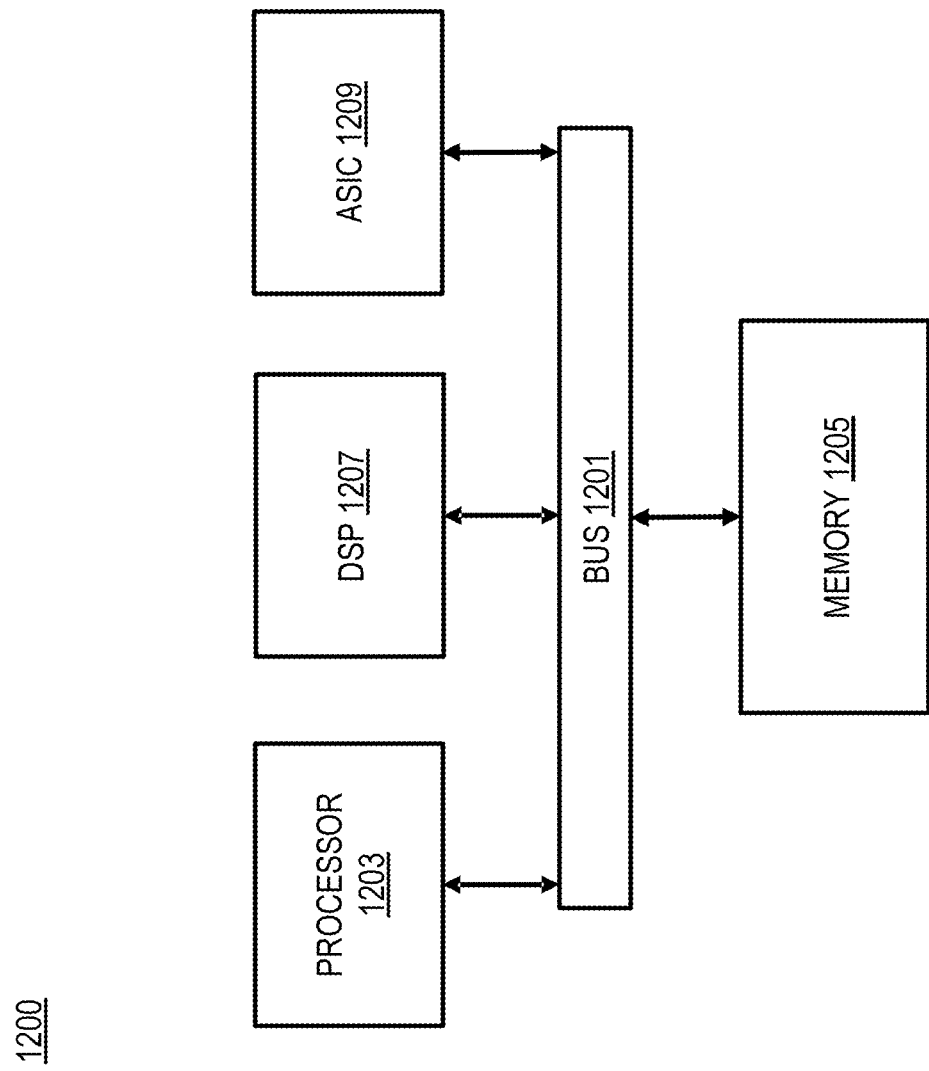
FIG. 12 is a diagram of a chip set that can be used to implement an embodiment of the processes described herein.

FIG. 12 illustrates a chip set 1200 upon which an embodiment of the invention may be implemented. Chip set 1200 is programmed to determine polyline homogeneity as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to determine polyline homogeneity. The memory 1205 also stores the data associated with or generated by the execution of the inventive steps.

Figure 13:
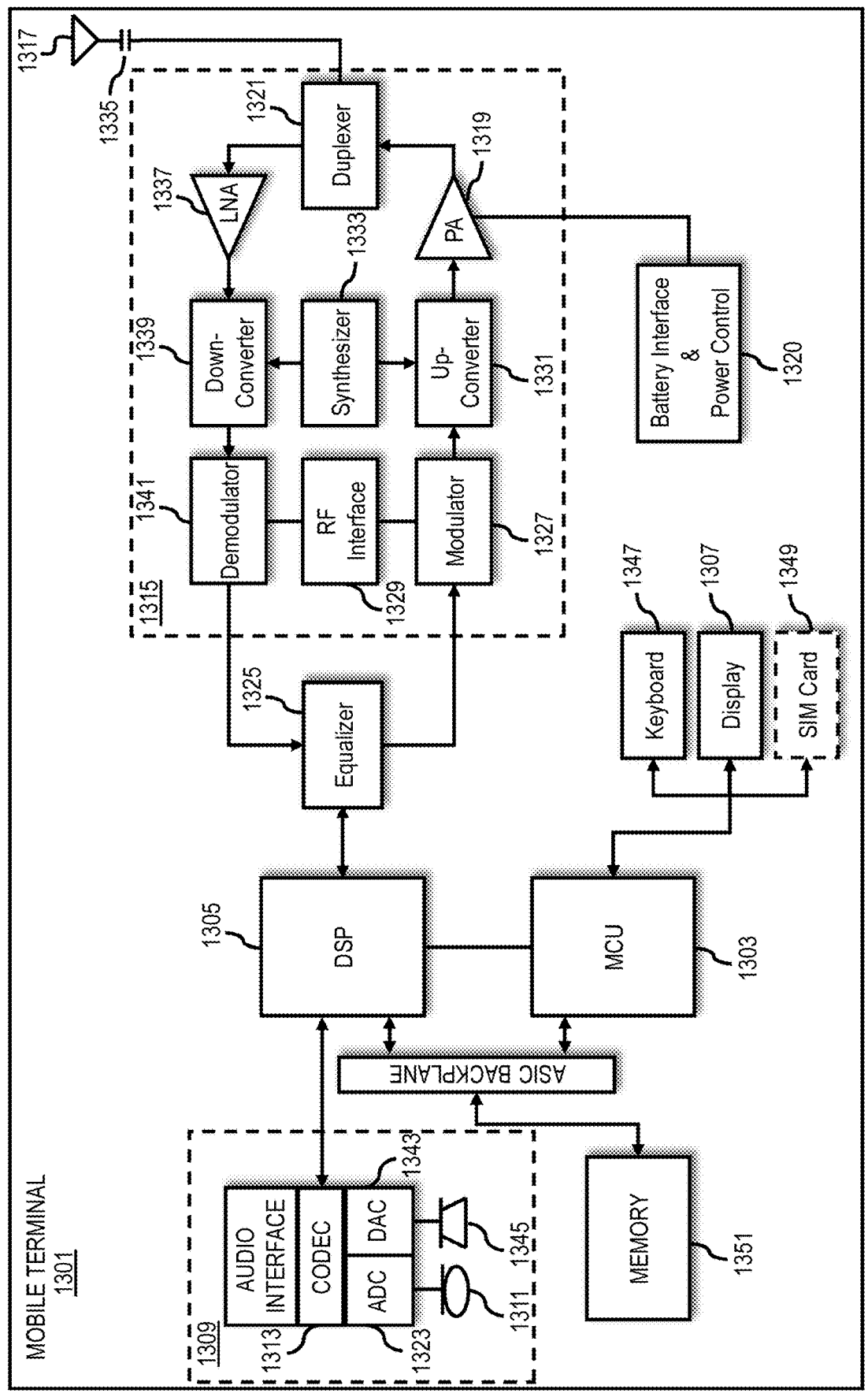
FIG. 13 is a diagram of a terminal that can be used to implement an embodiment of the processes described herein.

FIG. 13 is a diagram of exemplary components of a mobile station (e.g., UE 119 or other client device) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to determine polyline homogeneity. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing, by a computer vision system, a first image to determine a first set of pixels associated a first object;
   processing, by the computer vision system, a second image to determine a second set of pixels associated with a second object;
   determining a homogeneity metric between the first object and the second object based on a percent composition of the first set of pixels matching the second set of pixels;
   providing the homogeneity metric as an output; and
   determining a vehicle localization based on the output.

2. The method of claim 1, further comprising:
   determining a confidence of the vehicle localization based on the homogeneity metric.

3. The method of claim 2, further comprising:
   determining an autonomous drive mode of a vehicle based on the confidence.

4. The method of claim 1, wherein the first object, the second object, or a combination thereof are represented as one or more polylines.

5. The method of claim 4, wherein the first set of pixels, the second set of pixels, or a combination thereof are labeled with one or more polyline identifiers indicating the one or more polylines.

6. The method of claim 5, wherein the percent composition is determined based on the one or more polyline identifiers.

7. A method comprising:
   processing, by a computer vision system, a first image to determine a first set of pixels associated a first object;
   processing, by the computer vision system, a second image to determine a second set of pixels associated with a second object;
   determining a homogeneity metric between the first object and the second object based on a percent composition of the first set of pixels matching the second set of pixels;
   providing the homogeneity metric as an output; and
   providing a fault analysis of the computer vision system based on the output.

8. The method of claim 7, wherein the fault analysis is with respect to a feature or objection detection capability of the computer vision system.

9. A method comprising:
   processing, by a computer vision system, a first image to determine a first set of pixels associated a first object;
   processing, by the computer vision system, a second image to determine a second set of pixels associated with a second object;
   determining a homogeneity metric between the first object and the second object based on a percent composition of the first set of pixels matching the second set of pixels;
   providing the homogeneity metric as an output; and
   performing a dilation of the first set of pixels, the second set of pixels, or a combination by a designated window size of neighboring pixels before determining the percent composition.

10. An apparatus comprising:
    at least one processor; and
    at least one memory including computer program code for one or more programs,
    the at least one memory and the computer program code configured to, with the at least one processor, cause the apparatus to perform at least the following,
    process a first image to determine a first set of pixels associated a first object;
    process a second image to determine a second set of pixels associated with a second object;
    determine a homogeneity metric between the first object and the second object based on a percent composition of the first set of pixels matching the second set of pixels;
    provide the homogeneity metric as an output; and
    determine a vehicle localization based on the output.

11. The apparatus of claim 10, wherein the apparatus is further caused to:
    provide a fault analysis of a computer vision system based on the output.

12. The apparatus of claim 11, wherein the fault analysis is with respect to a feature or objection detection capability of the computer vision system.

13. The apparatus of claim 10, wherein the apparatus is further caused to:
    determine a confidence of the vehicle localization based on the homogeneity metric.

14. A non-transitory computer-readable storage medium carrying one or more sequences of one or more instructions which, when executed by one or more processors, cause an apparatus to at least perform the following steps:
    processing a first image to determine a first set of pixels associated a first object;
    processing a second image to determine a second set of pixels associated with a second object;
    determining a homogeneity metric between the first object and the second object based on a percent composition of the first set of pixels matching the second set of pixels;
    providing the homogeneity metric as an output; and
    determining a vehicle localization based on the output.

15. The non-transitory computer-readable storage medium of claim 14, wherein the apparatus is caused to further perform:
    providing a fault analysis of a computer vision system based on the output.

16. The non-transitory computer-readable storage medium of claim 15, wherein the fault analysis is with respect to a feature or objection detection capability of the computer vision system.

17. The non-transitory computer-readable storage medium of claim 14, further comprising:
  determining a confidence of the vehicle localization based on the homogeneity metric.

* * * * *